(12) United States Patent
Bennett et al.

(10) Patent No.: US 8,423,336 B2
(45) Date of Patent: Apr. 16, 2013

(54) AERODYNAMIC SIMULATION SYSTEM AND METHOD FOR OBJECTS DISPENSED FROM AN AIRCRAFT

(75) Inventors: John O. Bennett, Linton, IN (US);
Brent A. Waggoner, Sandborn, IN (US);
James T. Sweeten, Vincennes, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 714 days.

(21) Appl. No.: 12/639,620

(22) Filed: Dec. 16, 2009

(65) Prior Publication Data

US 2011/0143319 A1    Jun. 16, 2011

(51) Int. Cl.
*G06G 7/48* (2006.01)

(52) U.S. Cl.
USPC .................................................... 703/8

(58) Field of Classification Search ........................ 703/8
See application file for complete search history.

(56) References Cited

U.S. PATENT DOCUMENTS

| | | | | |
|---|---|---|---|---|
| 2,478,250 A * | 8/1949 | Daly et al. | ...................... | 434/15 |
| 4,176,468 A | 12/1979 | Marty, Jr. | | |
| 4,454,513 A | 6/1984 | Russell | | |
| 4,959,015 A | 9/1990 | Rasinski et al. | | |
| 4,969,819 A | 11/1990 | James | | |
| 5,228,854 A * | 7/1993 | Eldridge | ........................ | 434/11 |
| 5,495,562 A | 2/1996 | Denney et al. | | |
| 5,549,477 A | 8/1996 | Tran et al. | | |
| 5,592,850 A | 1/1997 | Rowan | | |
| 5,969,676 A * | 10/1999 | Tran et al. | ...................... | 342/442 |
| 7,205,520 B1 * | 4/2007 | Busse et al. | ................ | 250/203.6 |
| 7,403,326 B2 | 7/2008 | Shaw et al. | | |
| 7,500,423 B2 * | 3/2009 | Strand | .......................... | 89/41.03 |
| 7,533,612 B1 * | 5/2009 | Papayianis et al. | ........... | 102/211 |
| 2003/0215771 A1 | 11/2003 | Bartoldus et al. | | |
| 2005/0150371 A1 * | 7/2005 | Rickard | ......................... | 89/1.11 |
| 2006/0185506 A1 * | 8/2006 | Strand | .......................... | 89/41.03 |
| 2006/0284050 A1 * | 12/2006 | Busse et al. | ................ | 250/203.1 |
| 2009/0128394 A1 | 5/2009 | Shin et al. | | |
| 2010/0026554 A1 * | 2/2010 | Longman et al. | ............... | 342/62 |

OTHER PUBLICATIONS

Marvin O. Sleven, Gene Sheridan, "Three Dimensional Chaff Simulator" IEEE Transactions Nov. 1966, pp. 75-80.*
Forrai, D.P. and Maier, James J., "Generic Models in the Advanced IRCM Assessment Model", Proceedings of the 2001 Winter Simulation Conference, pp. 789-796.
MTSI—Modern Technology Solutions, Inc., "Capability Statement: Modeling & Simulation", 1 page, Aug. 7, 2007.
Willers, C.J. and Wheeler, M.S., "Application of Image Simulation in Weapon System Development", Council for Scientific and Industrial Research (CSIR), Rev. Jul. 29, 2007, 6 pages.
Annamalai, L., "Integrated Electronic Warfare Framework for Infrared Self-protection of Transport Aircraft", Council for Scientific and Industrial Research (CSIR), Sep. 16, 2007, 3 pages.
Latger, J. and Talaron, J.F., "A Useful Kernel to Make Realistic Infrared Simulation", OKTAL Company, Sep. 7, 2007, 15 pages.

(Continued)

*Primary Examiner* — Dwin M Craig
(74) *Attorney, Agent, or Firm* — Christopher A. Monsey

(57) ABSTRACT

A system and method implemented on a computing device are provided to simulate trajectories of objects dispensed from a moving aircraft.

62 Claims, 17 Drawing Sheets

OTHER PUBLICATIONS

Robinson, R., Oleson, J., Rubin, L. and McHugh, S., "MIRAGE: System Overview and Status", Santa Barbara Infrared, Inc., Jan. 30, 2003, 12 pages.

Delport, J.P., Willers, N., Leroux, F., "The Use of Simulation in Flare Countermeasure Development", DPSS Optronics, Nov. 12, 2008, 14 pages.

Forrai, D. and Maier, J., "AIRSAM: A Tool for Assessing Airborne Infrared Countermeasures", May 30, 2000, 7 pages.

Northrop Grumman, "Best Practice: Infrared Countermeasures Simulation and Test", http://www.bmpcoe.org/bestpractices/internal/ngdsd/ngdsd_2.html, Rev. Jan. 18, 2007, 2 pages.

Zhang Wen-Hua, Xing, W., Feng-Ming, Z. and Zhong-Xiang, T., "Mathematic modeling and simulation for aerodynamic radiation characteristics of infrared decoy", Journal of System Simulation, vol. 20, No. 21, Nov. 2008, one page.

US Air Force, "Computer models Used by the Assistant Chief of Staff Studies and Analyses", Aug. 1979, 90 pages.

Waite, W.F., Swenson, S.J., Jolly, A.C., Shepherd, S., Gravitz, R.M., "Validation of Hardware-in-the-Loop (HWIL) and Distributed Simulation Systems", Foundations for V&V in the 21$^{st}$ Century Workshop, Oct. 22, 2002, 87 pages.

* cited by examiner

AERODYNAMIC SIMULATION SYSTEM AND METHOD FOR OBJECTS DISPENSED FROM AN AIRCRAFT

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND AND SUMMARY

The present disclosure relates generally to systems and methods for simulating the aerodynamic performance of objects dispensed from a moving aircraft. More particularly, the present invention relates to a system and method for calculating predicted trajectories of a plurality of objects, such as expendable countermeasures for example, dispensed from a moving aircraft to assist with evaluating the performance (safety, effectiveness, etc.) of such objects.

Infrared countermeasures are often dispensed from aircraft to counter heat seeking surface-to-air missiles or air-to-air missiles. Such infrared countermeasures are typically decoy flares having a burning temperature equal to or hotter than engine exhaust of the aircraft. The goal of such infrared countermeasures is to make the heat seeking missiles seek out the heat signature of the burning flare rather than the heat signature of the aircraft's engines.

Infrared countermeasures are typically launched as projectiles, gravity-fed, or otherwise dispensed from object dispensers located inside the aircraft's fuselage. The countermeasure dispensers are programmable to dispense flares at predetermined intervals. With pyrotechnic flares, the dispensers automatically ignite the flares as they are being dispensed.

In an exemplary embodiment of the present disclosure, a method implemented on a computing device simulates trajectories of objects dispensed from a moving aircraft. The computing device has a processor capable of accessing a memory and at least one input device. The illustrated method includes storing object dispenser data in a database in the memory of the computing device. The object dispenser data includes locations and orientations of object dispensers linked to an aircraft. The method also includes receiving input data from an input device to select an aircraft for the simulation, retrieving object dispenser data from the database stored in the memory of the computing device to determine a location and an orientation of at least one object dispenser relative to the selected aircraft, and receiving input data from the input device to define flight conditions for the aircraft. The flight conditions include an inertial position in an inertial coordinate system, an inertial heading, and a flight speed of the aircraft. The method further includes receiving input data from the input device to define an object dispense sequence for the at least one object dispenser, and calculating a trajectory for each object dispensed from the at least one object dispenser using the processor of the computing device.

In another exemplary embodiment of the present disclosure, a system for simulating trajectories of objects dispensed from a moving aircraft includes a display, at least one user input device, a processor operatively coupled to the display and the at least one input device, a memory accessible by the processor, and an object dispenser database stored in the memory. The object dispenser database includes object dispenser data indicating locations and orientations of a plurality of object dispensers linked to a plurality of aircraft. The system also includes trajectory simulation software stored in the memory for execution by the processor. The trajectory simulation software includes a first processing sequence for generating a graphical user interface to select an aircraft for the simulation, a second processing sequence for retrieving object dispenser data from the database stored in the memory to determine a location and an orientation of at least one object dispenser relative to the selected aircraft, and a third processing sequence for generating a graphical user interface to define flight conditions for the aircraft. The flight conditions include an inertial position in an inertial coordinate system, an inertial heading, and a flight speed of the aircraft. The trajectory simulation software also includes a fourth processing sequence for generating a graphical user interface to define an object dispense sequence for the at least one object dispenser, and a fifth processing sequence for calculating a trajectory for each object dispensed from the at least one object dispenser.

In yet another exemplary embodiment of the present disclosure, a computer program product comprises a computer usable medium having a computer readable program code embodied therein, the computer readable program code being adapted to be executed to implement a method for simulating trajectories of objects dispensed from a moving aircraft. The illustrated method includes a first processing sequence for generating a graphical user interface to select an aircraft for the simulation, a second processing sequence for retrieving object dispenser data from a database to determine a location and an orientation of at least one object dispenser relative to the selected aircraft, and a third processing sequence for generating a graphical user interface to define flight conditions for the aircraft. The flight conditions include an inertial position in an inertial coordinate system, an inertial heading, and a flight speed of the aircraft. The illustrated method also includes a fourth processing sequence for generating a graphical user interface to define an object dispense sequence for the at least one object dispenser, and a fifth processing sequence for calculating a trajectory for each object dispensed from the at least one object dispenser.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and other features of this invention will become more readily appreciated and better understood by reference to the following detailed description when taken in conjunction with the accompanying drawings in which:

FIG. 10 illustrates a display and input module configured to input aircraft initial conditions for use in the simulation;

FIG. 11 is a display and input module used to set aircraft maneuvers to be executed during the simulation;

DETAILED DESCRIPTION OF THE DRAWINGS

Figure 1:
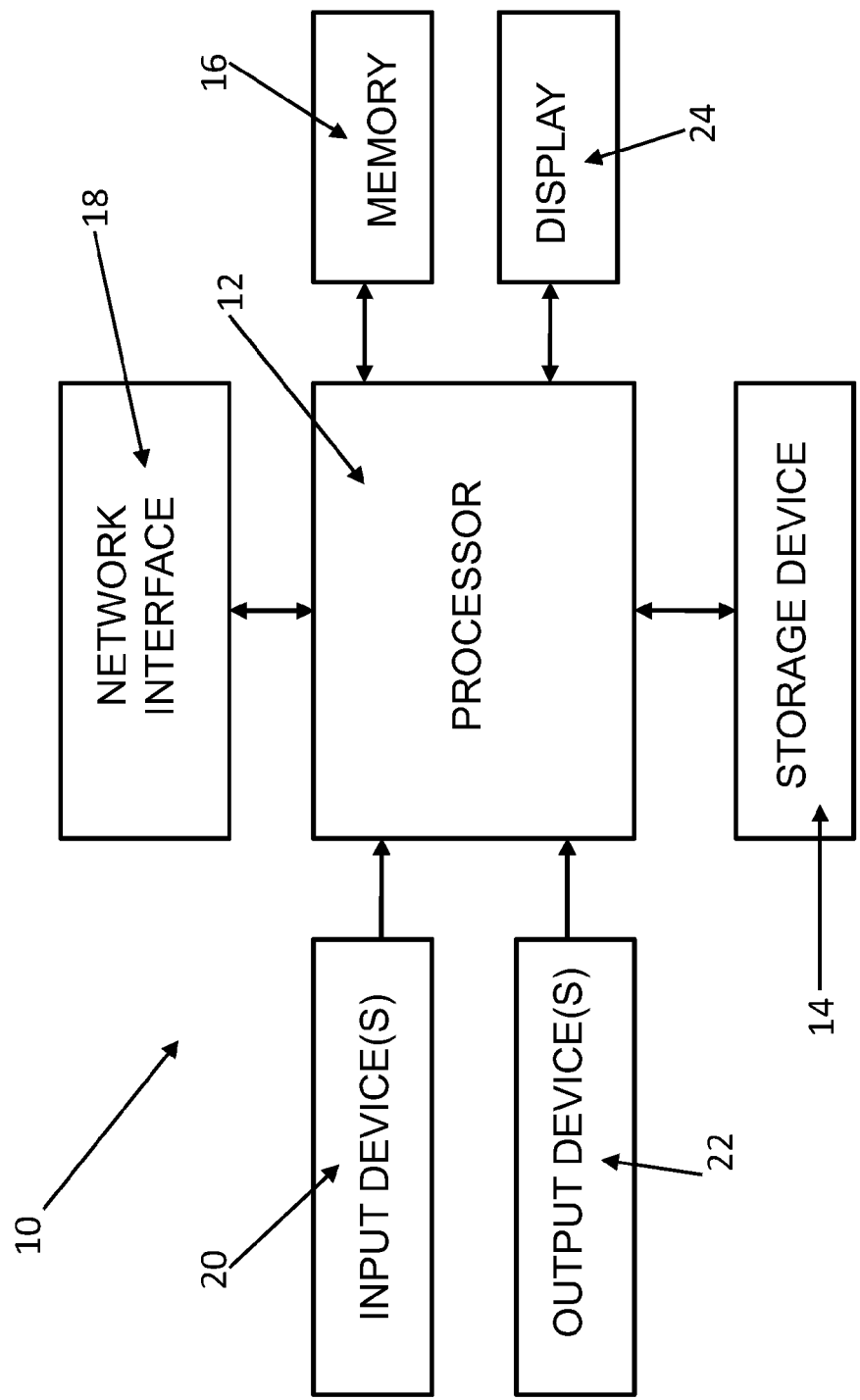
FIG. 1 is a block diagram of illustrative hardware components of an aircraft countermeasure aerodynamic simulation system.

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates.

Referring to FIG. 1, a computing device 10 an illustrated embodiment of the present disclosure is illustrated. Computing device 10 may comprise a desktop personal computer, a handheld computer, a laptop computer, a network appliance, a gaming console and/or any other suitable computing device. In the exemplary embodiment, the computing device 10 includes a processor 12, a storage device 14, a memory 16, a network interface 18, one or more user input devices 20, and one or more output devices 22. The network interface 18 operably couples the computing device 10 to a communication network such that the computing device 10 may communicate with other computing devices via the communications network.

The processor 12 is generally operable to obtain software and/or firmware instructions from the storage device 14, load them into memory 16, and execute the instructions from memory 16. The storage device 16 is generally operable to store data and/or software instructions for the computing device 10. To this end, the storage device 14 and/or memory 16 may include a hard disk drive, random access memory, a CD-ROM drive, a DVD-RAM drive, a RAID device, a Disk-On-Chip device and/or other suitable computer readable and/or writeable media devices.

The computing device 10 also includes one or more user input devices 20. In general, the user input devices 20 provide a user of the computing device 10 with mechanisms for entering information into the computing device 10 and/or controlling the operation of the computing device 10. Illustratively, the user input devices 20 may include a mouse, a keyboard, a touch pad, a push button, a scanner, a stylus, a touch screen, and/or other suitable input devices that provide a user of the exemplary computing device 10 with an interface to directly or indirectly control the operation of the computing device 10. A display 24 is also illustratively coupled to the processor. The display 24 may include a cathode ray tube ("CRT"), a liquid crystal display ("LCDs"), light emitting diodes ("LEDs"), and/or other output devices that are operable to visually present information to a user of the exemplary computing device 10. The output devices 22 may include sound cards, wave generators, sequencers, mixers, speakers, and/or other audio devices that are used to audibly present information to a user of the exemplary computing device 10. Output devices 22 may also include a printer, fax machine, or an electronic messaging system.

The computing device 10 provides a system and method for aerodynamic modeling of objects dispensed from an aircraft. The computing device 10 receives multiple inputs as discussed below and calculates predicted trajectories of the dispensed objects to permit evaluation of the effectiveness of protecting the aircraft against various guided heat-seeking missile threats. The display 24 illustratively provides a graphical user interface (GUI) to facilitate configuration of the system, input of simulation parameters and analysis of the simulation results. Throughout the description of an illustrated embodiment of the present disclosure, a system and method for aerodynamic modeling of countermeasures such as decoys or flares dispensed from the aircraft is described in detail. It is understood, however, that the trajectory simulation software module 34 discussed below may also be used to calculate trajectories of other axi-symetric objects such as bombs or sonobuoys, for example, which are dropped, ejected or launched from object dispensers on the aircraft. Sonobuoys are expendable sonar systems that are dropped or ejected from an object dispenser on the aircraft for assisting with anti-submarine warfare and/or under water acoustic research.

Figure 2:
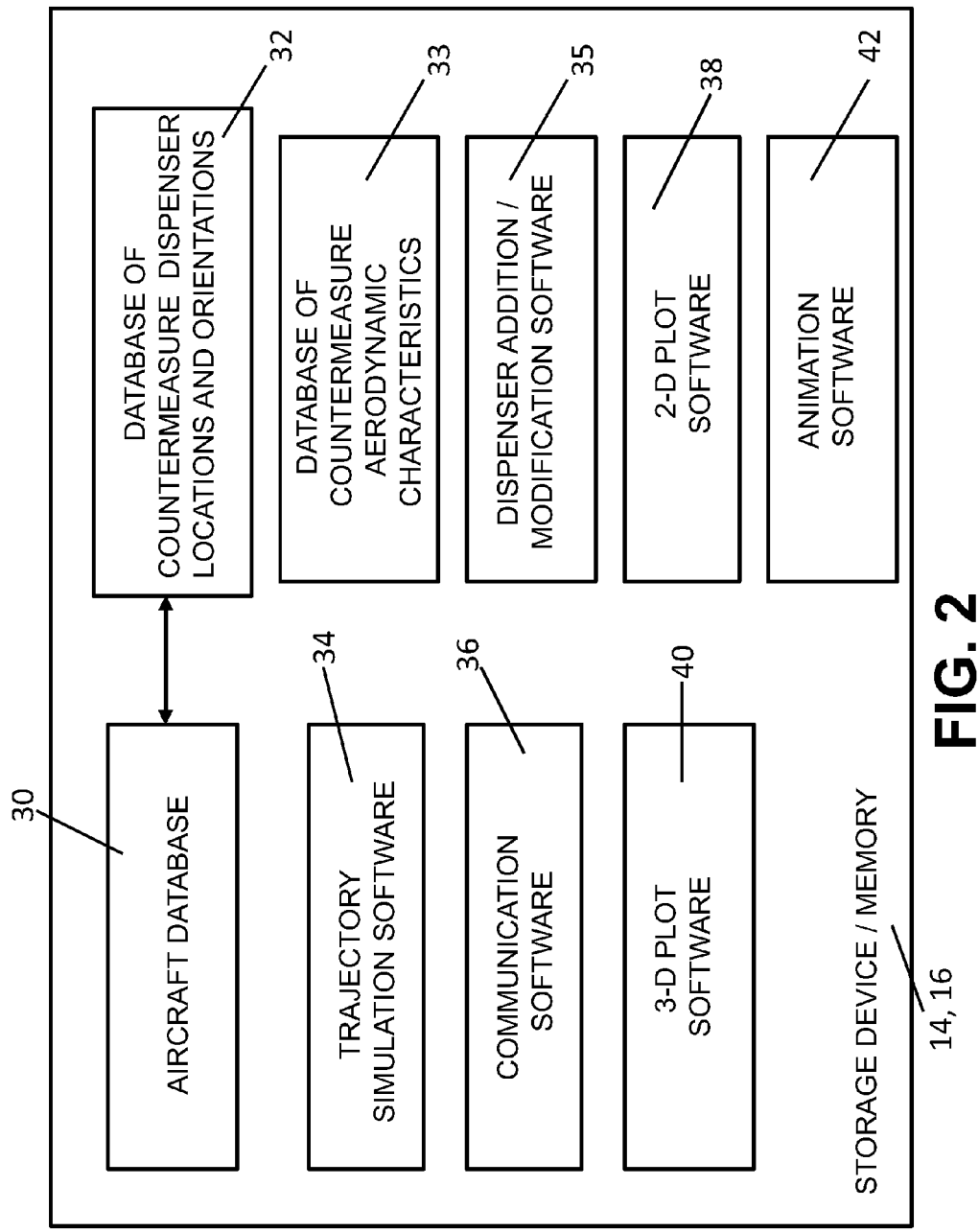
FIG. 2 is a block diagram illustrating a plurality of software modules stored in a memory and accessible by a processor of the aircraft countermeasure simulation system of an illustrated embodiment of the present disclosure.

As discussed above, processor 12 has access to memory 16 and executes software stored in the memory 16 and/or storage device 14. As illustrated in FIG. 2, the storage device 14/memory 16 illustratively includes an aircraft database 30 which illustratively includes wire-frame data describing the outer body dimensions of each aircraft. The aircraft database 30 is linked to a database 32 including details of the location and orientations of countermeasure dispensers located on a particular aircraft. As discussed in more detail below, the database 32 includes information on the location of each dispenser on a particular aircraft. Database 32 also includes dispensing angles and orientations for each dispenser relative to the aircraft. In an illustrated embodiment, standard dispenser locations for each aircraft in database 30 are stored in database 32. As discussed below, an operator or user of the simulation system 10 may add countermeasure dispensers to or modify countermeasure dispensers of a particular aircraft. Such additions or modifications to provide customized dispenser data can also be stored in the database 32, linked to a particular aircraft 30 and analyzed by the present simulation system and method. Storage device 14 and/or memory 16 also includes a database 33 which stores data related to the aerodynamic characteristics of the dispensed objects—such as the expendable countermeasures. These aerodynamic characteristics include, but are not limited to, ejection velocity, mass versus time profile, normal and axial force coefficients, and pitch moment and damping coefficients. In an illustrated embodiment, users may use an input device 20 to enter data related to a desired aircraft, a desired dispenser, or a desired object. This input data is stored in appropriate data files in appropriate directories of aircraft database 30, dispenser database 32 and/or object database 33. Therefore, this user-created data may be used during future simulations to provide customized results.

Storage device 14 and/or memory 16 also includes a trajectory simulation software module 34. The trajectory simulation software 34 calculates trajectories of the dispensed countermeasures based on a plurality of input parameters discussed in detail below. Storage device 14 and/or memory 16 may also include communication software 36 for communicating with other devices through communication network interface 18. Storage device 14 and/or memory 16 may also include two dimensional plotting software 38, three dimensional plotting software 40 and animation software 42 which creates visual representations of predicted countermeasure trajectories from the results calculated by a trajectory simulation software module 34 and displays the visual representations on display 24.

Figure 3:
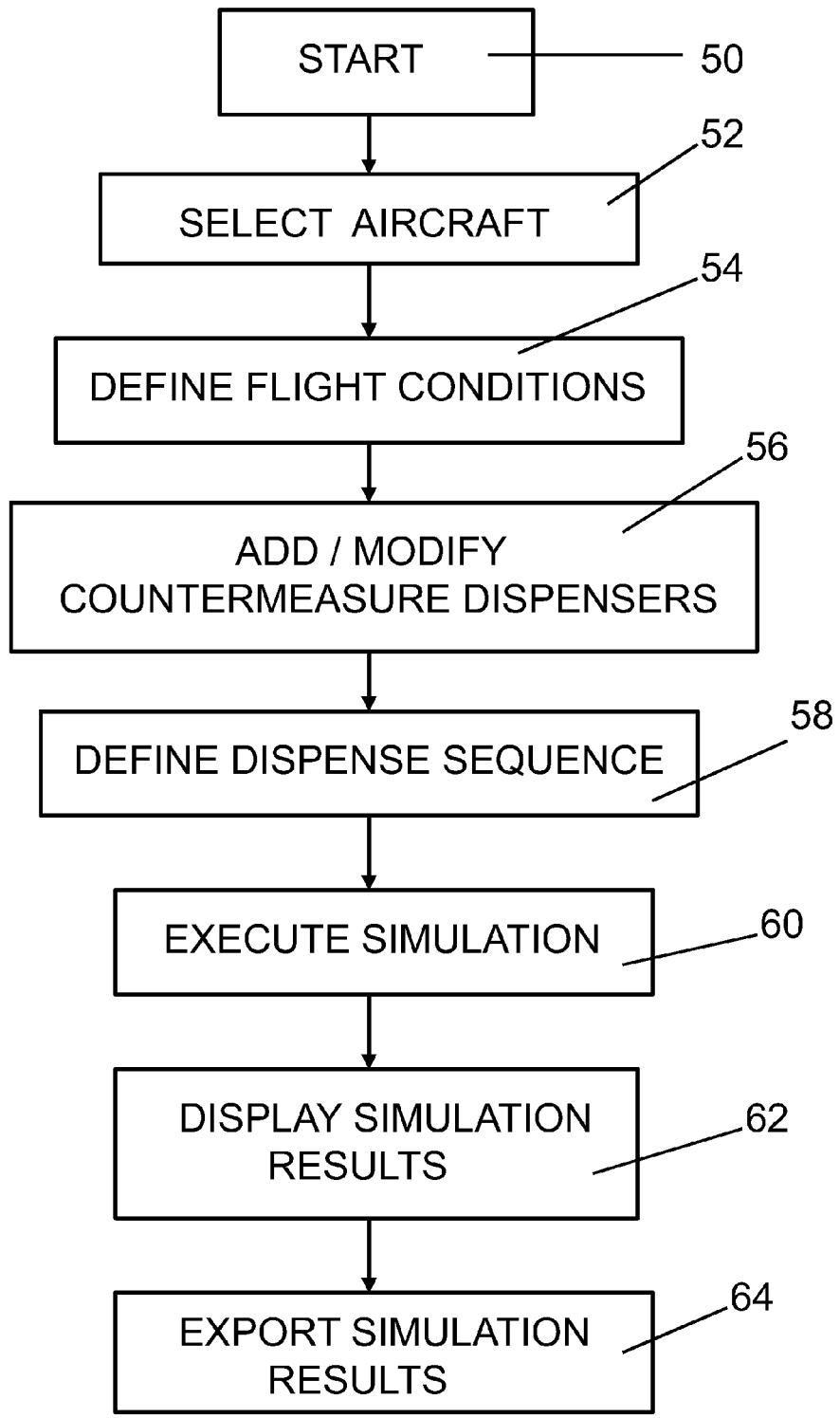
FIG. 3 is a flowchart illustrating the steps performed by the simulation system in accordance with a method of the present disclosure.

Operation of the aircraft countermeasure aerodynamic simulation system and method is illustrated in FIG. 3. System operation begins at block 50 with the creation of a run configuration. The initial configuration of the system may be done using input devices 20 along with the GUI display 24. First, a particular aircraft is selected for the simulation as illustrated at block 52. Next, a user defines flight conditions for the aircraft as illustrated at block 54. For example, altitude and speed is entered to define the flight conditions. When an aircraft is selected, processor 12 accesses the aircraft database 30 and database 32 of countermeasure dispenser locations and orientations. Therefore, the trajectory simulation software knows the dispenser locations and orientations corresponding to the selected aircraft for use in the trajectory calculations.

If desired, the user can add or modify countermeasure dispensers to the selected aircraft as illustrated at block 56. These additions or modifications may be stored in the database 32 and used by the trajectory simulation software 34 during calculations of the predicted countermeasure trajectories. Next, the user defines a dispense sequence for each of the dispensers associated with the selected aircraft as illustrated at block 58. Again, the trajectory simulation software 34 uses the dispense sequence in the calculation of the predicted countermeasure trajectories. Blocks 52, 54, 56 and 58 illustrate the configuration of the system. Once the system is configured, the user executes the simulation as illustrated at block 60. As discussed below, the user may display the simulation results in a variety of different ways as illustrated at block 62. The simulation results may also be exported as a data file, such as a text file, for example, for use as an input in other simulations, such as missile fly out models, or aircraft vs. missile engagement simulations, as illustrated at block 64.

Figure 4:
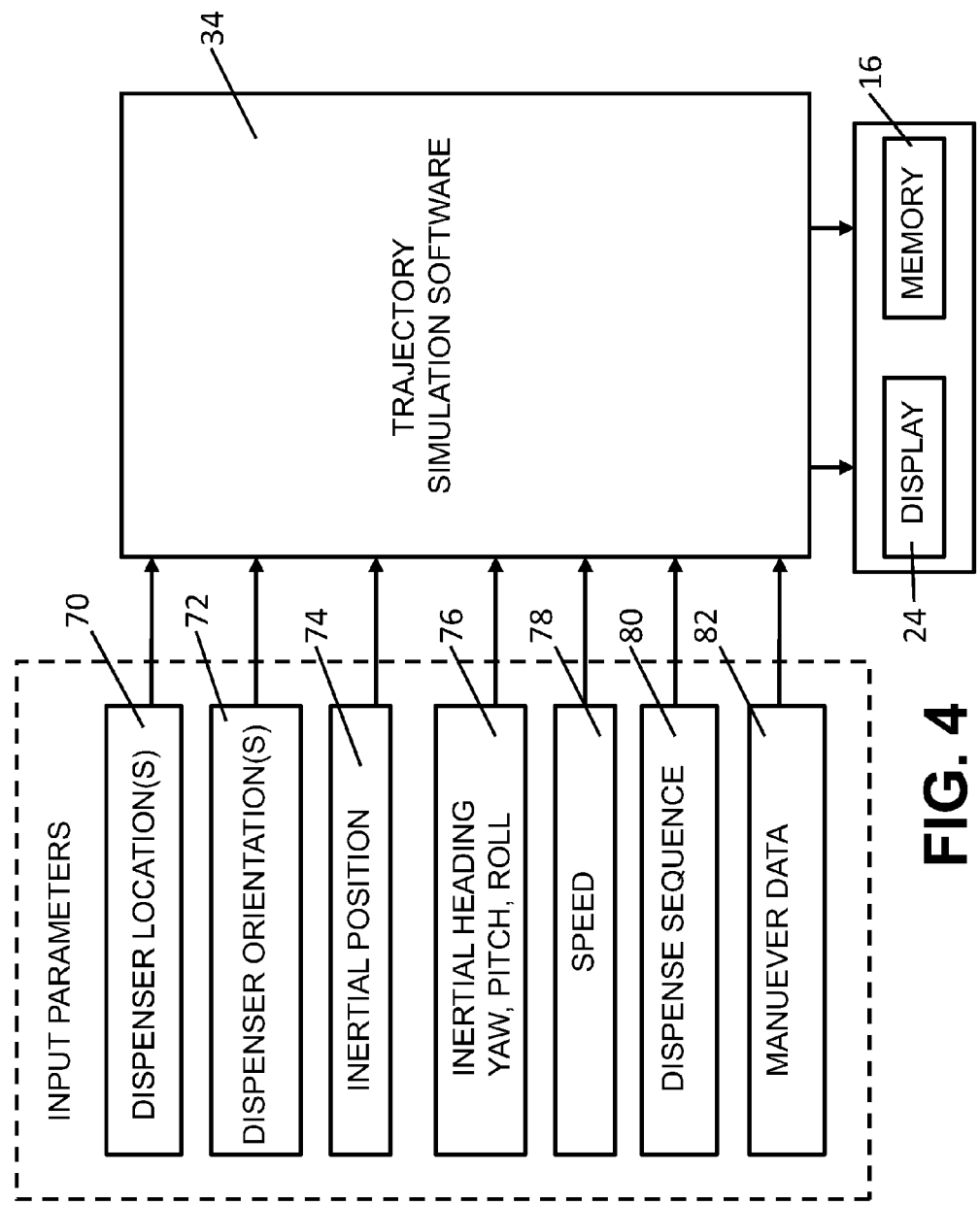
FIG. 4 illustrates a plurality of input parameters for an exemplary embodiment of a countermeasure trajectory simulation software module.

Illustrative input parameters to the trajectory simulation software 34 are shown in FIG. 4. As discussed above, the trajectory simulation software 34 receives inputs indicating the various dispenser locations on the aircraft as illustrated at block 70 as well as the orientations of each dispenser relative to the aircraft as illustrated at block 72. The dispenser locations 70 and orientations 72 may be retrieved from database 32 based on the selected aircraft or received as manual inputs from the user as discussed below.

The trajectory simulation software 34 also receives inputs indicating an inertial position of the aircraft as illustrated at block 74 and data indicating an inertial heading for the aircraft including yaw, pitch and roll as illustrated at block 76. Trajectory simulation software 34 further receives an input indicating the speed of the aircraft as illustrated at block 78. A dispense sequence for the countermeasures from the dispensers is also provided as an input parameter as illustrated at block 80. Trajectory simulation software 34 may also receive maneuver data inputs for simulating different aircraft maneuvers as illustrated at block 82. The user can also input wind speed and direction, output time step, simulation total run time, output units (English or Metric), and a coordinate system for output data.

Figure 5:
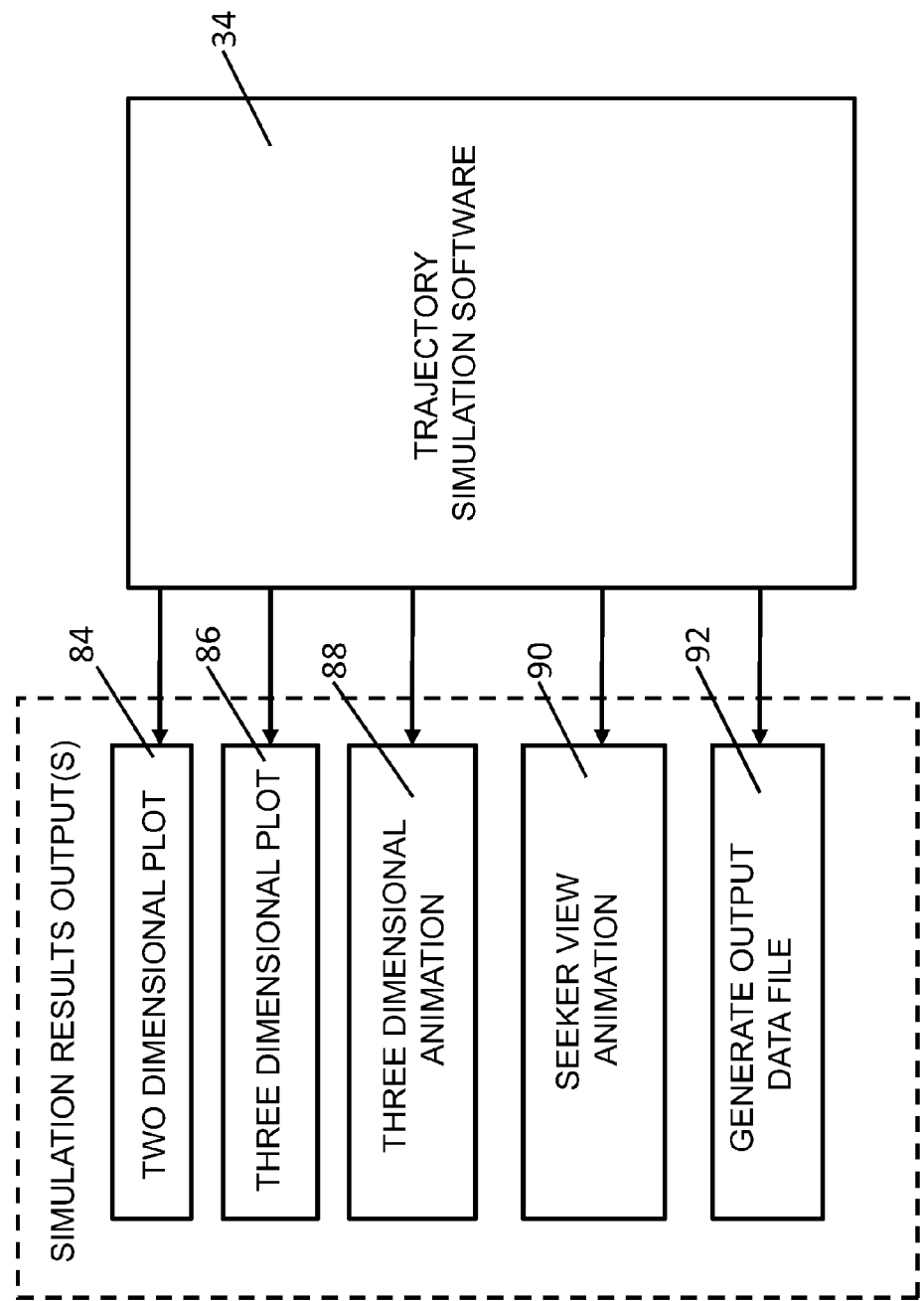
FIG. 5 illustrates a plurality of different illustrative simulation result outputs generated by the software of the simulation system.

FIG. 5 provides illustrative examples of outputs created using the results from the trajectory simulation software calculations. Countermeasure trajectory calculations made by the trajectory simulation software 34 may be stored in storage device 14 and/or memory 16 and/or displayed on display 24 in a variety of manners using the 2-D plot software 38, the 3-D plot software 40 or the animation software 42 as discussed in more detail below. For example, the trajectory calculations may be displayed as a two dimensional plot calculated by 2-D plot software 38 and displayed on display 24 as illustrated at block 84. The countermeasure trajectories calculated by trajectory simulation software 34 may also be displayed as a three dimensional plot as calculated by 3-D plot software 40 and displayed on display 24 as illustrated at block 86. Alternatively, the trajectory calculations may be displayed as a 3-D animation generated by animation software 42 and displayed on display 24 as illustrated at block 88. The animation software 42 may also display the results as a seeker view animation as illustrated at block 90. In the seeker view animation, the aircraft and dispensed countermeasures are displayed from the point of view of an approaching missile as discussed below. Next, the calculated trajectories may be exported as an output data file, 2-D plot, 3-D plot or animation as illustrated at block 92. The output data file may be a text file, for example, containing the trajectory simulation results which can be used as an input to other simulations, such as missile fly out models. The output data file may be stored to storage device 14 or sent to another computing device using communication software 36 and network interface 18.

Figure 9:
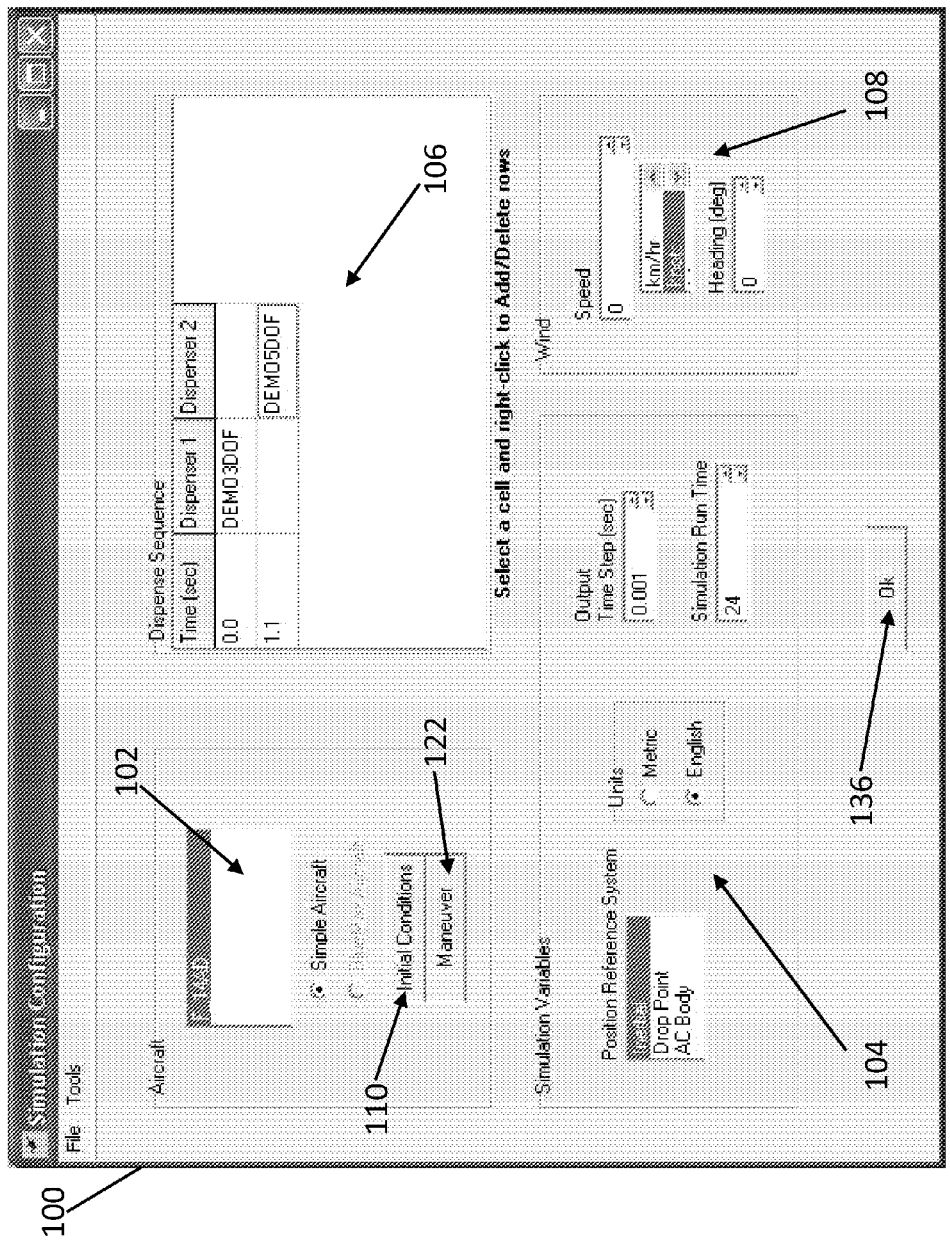
FIG. 9 is an illustrated display and input module for providing initial set up and run configuration for the input parameters to the trajectory simulation software including selection of an aircraft, setting of a dispense sequence, setting of simulation variables, and setting wind speed.

Operation of the aircraft countermeasure aerodynamic simulation system and method in accordance with an illustrated embodiment of the disclosure is shown in more detail in FIGS. 9-18. FIG. 9 illustrates an exemplary display and input module displayed on display 24 which provides a graphical user interface (GUI) for a user to provide input parameters for the trajectory simulation software 34. An illustrated display module 100 provided for configuring the simulation is shown in FIG. 9. A user may select a particular aircraft for the simulation from a menu of possible aircraft at location 102. Selection can be made in a conventional manner using a touch screen, mouse, keyboard or other input device 20. In the FIG. 9 embodiment, only an F-14 aircraft is shown. However, typically a plurality of different aircraft are stored in aircraft database 30 and displayed on the menu 102 for selection by a user. Of course, the user can also manually create a desired aircraft data file which will then be available on the menu for use the next time the system is run.

Other simulation variables are set using inputs at location 104. For example, the particular position reference system, units of measure, output time step and a simulation run time may be entered using the inputs at location at 104. A dispense sequence for the various dispensers associated with the selected aircraft may be adjusted using input devices 20 as shown at location 106. The wind speed and direction for the simulation may be adjusted at location 108.

As discussed above, when a particular aircraft is selected or entered at block 102, trajectory simulation software 34 retrieves information related to the selected aircraft from aircraft database 30 and from the database 32 containing countermeasure dispenser locations and orientations for the selected aircraft. In the illustrated embodiment of FIG. 9, the selected aircraft includes two dispensers labeled as Dispenser 1 and Dispenser 2 in dispenser sequence selection area 106. For other aircraft, a greater or lesser number of dispensers may be used. The user can change the time that the dispensers dispense their countermeasures by changing the information in the table in display area 106. Rows can be added or deleted so that a dispenser can dispense a plurality of countermeasures during the dispense sequence, if desired.

Figures 10, 11:
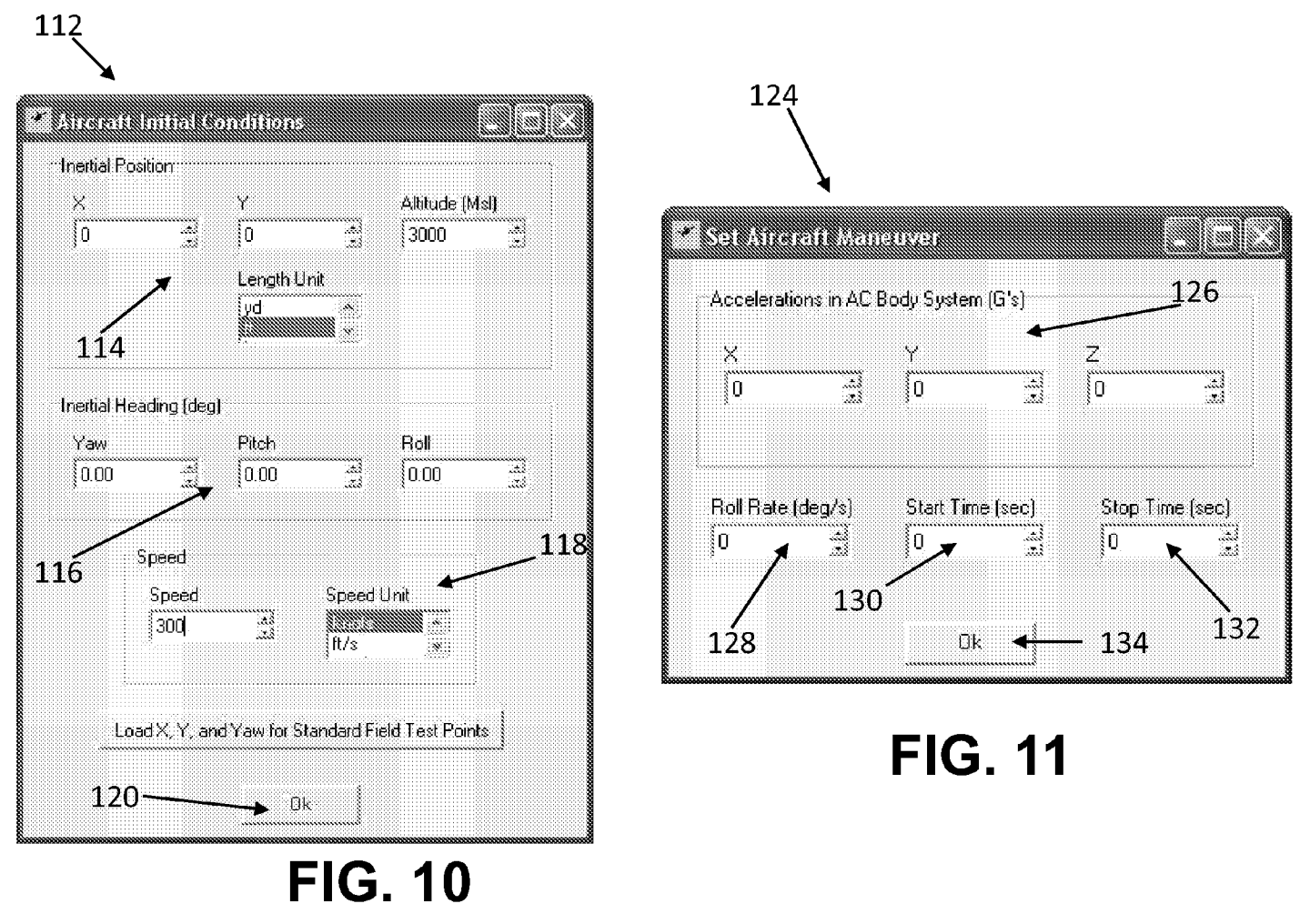

Next, the user sets initial conditions for the simulation by selecting button 110 in FIG. 9 labeled "Initial Conditions". Selecting button 110 causes an aircraft initial condition display and input module 112 to be displayed on the GUI as illustrated in FIG. 10. The user inputs an inertial position for the aircraft at block 114. For example, the user may adjust X and Y positions for the aircraft as well as the aircraft altitude in block 114. The length unit used in the simulation may also be changed as shown in FIG. 10. The user may adjust an inertial heading for the aircraft as illustrated at block 116. Different settings for yaw, pitch and roll of the aircraft may be provided, if desired. Next, the user inputs the speed of the aircraft at block 118. The user may also select the associate speed unit of measure at block 118. Once the aircraft initial conditions are set, the user selects the "OK" button 120 and the initial conditions are stored in storage device 14 and/or memory 16 for the particular simulation configuration.

The user can also input a particular maneuver or series of maneuvers for the aircraft by selecting the "Maneuver" button 122 in FIG. 9. When the maneuver button 122 is selected, display and input module 124 is displayed on the GUI display 24 as shown in FIG. 11. The user can set accelerations for the aircraft body system in number of G force units in the X, Y and Z directions using inputs at location 126. As discussed below, the X direction sets roll, the Y direction sets pitch and the Z direction sets yaw. The user can also set a roll rate for the aircraft using input 128, a start time for the maneuver using input 130, and a stop time for the maneuver using input 132. When the aircraft maneuver is set, the user clicks the "OK" button 134 which stores the particular maneuver in storage device 14 and/or memory 16 for use by the trajectory simulation software 34.

Figure 12:
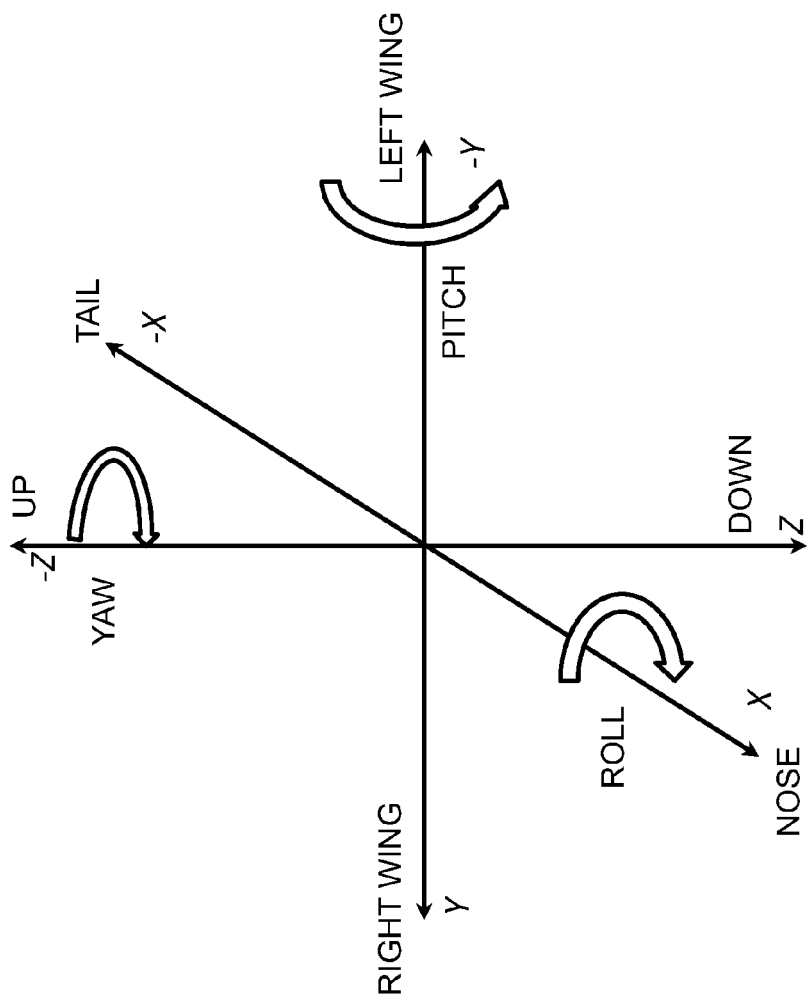
FIG. 12 is a diagrammatical view illustrating roll, pitch, and yaw around x, y and z axes, respectively, of an aircraft.

The X, Y and Z axes relative to an aircraft used by the trajectory simulation software 34 are shown in FIG. 12. The nose of the aircraft is in the direction of the positive X axis, while the tail of the aircraft is located in the −X axis direction. The right wing of the aircraft is along the positive Y axis and the left wing of the aircraft is along the −Y axis. The Z axis runs in a vertical direction through the aircraft, with the positive Z axis being directly downwardly. The roll of the aircraft is rotation about the X axis, pitch of the aircraft is rotation about the Y axis, and yaw of the aircraft is rotation about the Z axis as illustrated in FIG. 12.

Figure 13:
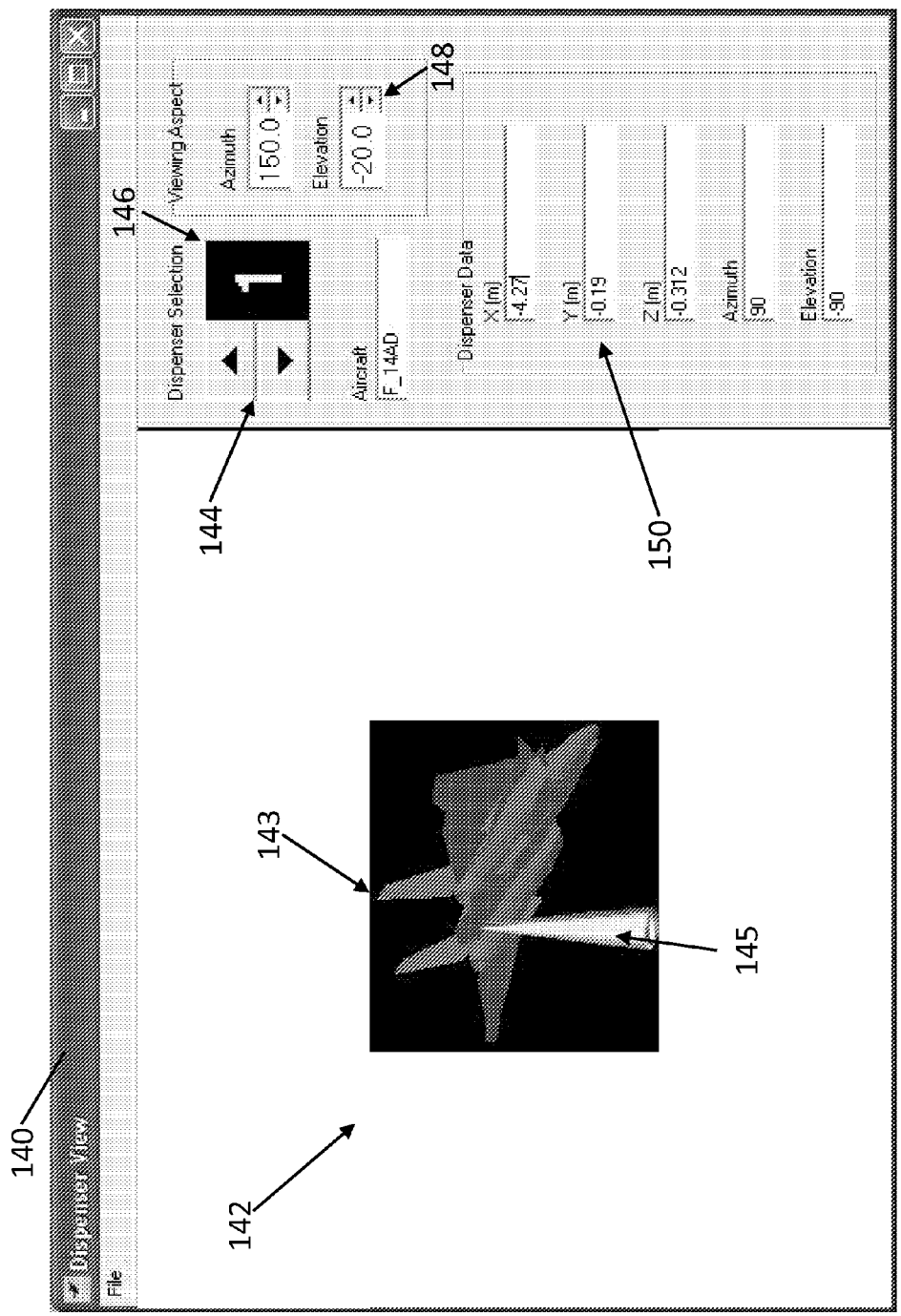
FIG. 13 is an illustrated embodiment of a display and input module showing orientations of countermeasure dispensers on a selected aircraft.
Figure 14:
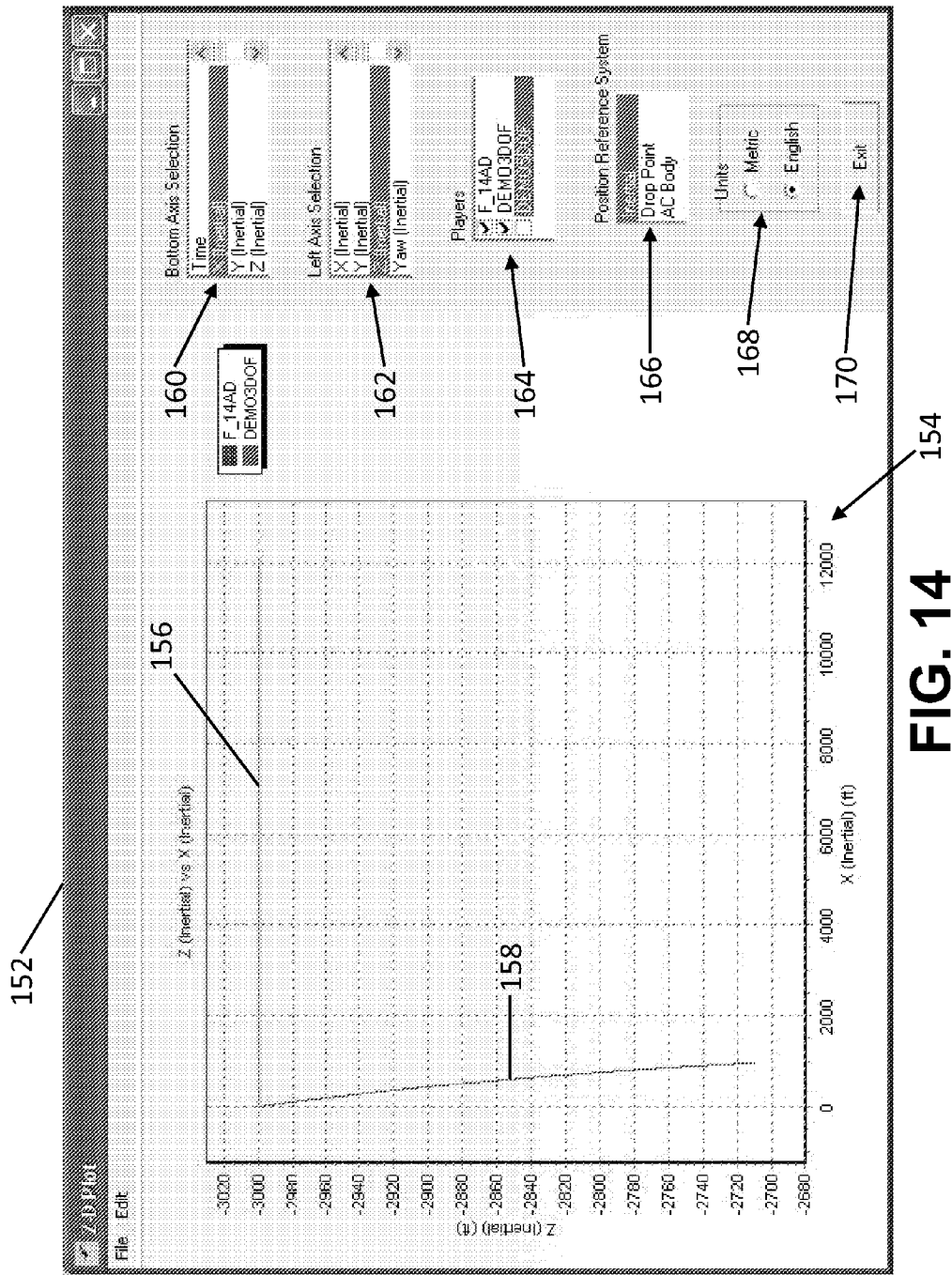
FIG. 14 is an illustrated two-dimensional trajectory plot for an aircraft dispensed countermeasure as calculated by the simulation software.

Once the simulation run configuration of FIG. 9 is complete, the user selects the "OK" button 136 of FIG. 9 which stores the configuration settings in storage device 14 and/or memory 16 for use by the trajectory simulation software 34. A user can also select to view dispenser locations for a selected aircraft. FIG. 13 illustrates a dispenser view display and input module 140 which is illustratively displayed on the GUI display 24. An image is shown in area 142 of the display screen. The image shows an aircraft 143 along with dispense direction indicators 145 for each of the dispensers associated with the selected aircraft. The user can select different dispensers for highlighting at a dispenser selection area 144 of the GUI display 24. The particular dispenser being highlighted in display area 142 is shown at location 146. By selecting the associated arrows in selection area 144, the user can scroll through the plurality of different dispensers associated with the particular selected aircraft. The selected dispenser location and the dispense direction indicator may either be displayed individually or simultaneously. An aircraft 143 and dispense direction indicator 145 for Dispenser 1 are shown in area 142 in FIG. 13. When multiple dispense direction indicators are displayed simultaneously, the dispense direction indicator of the selected dispenser may be highlighted in a different color to distinguish it from the dispense direction indicators of the non-selected dispensers.

The user can change the viewing aspect of the images 143, 145 by changing the azimuth and elevation of the viewer location at input area 148 of the GUI display 140. Changing the azimuth and elevation will change the perspective of the image shown in the display area of the aircraft 143 and the dispense direction indicator 145.

The dispenser data associated with the selected dispenser (Dispenser 1) is illustrated at region 150 of FIG. 13. For each dispenser, the X, Y and Z locations are displayed using the coordinate system shown in FIG. 12. In addition, the azimuth and elevation (orientation relative to the aircraft) of the particular dispenser is also shown in region 150. In the illustrated example, Dispenser 1 of the selected F-14 aircraft is located 4.27 meters toward the tail of the aircraft, 0.19 meters toward the left wing of the aircraft, and 0.312 meters above the centerline of the aircraft. The azimuth angle is 90°, and the elevation is −90° which means the dispenser is pointed straight down.

After the various input parameters discussed above are entered, the user can execute the trajectory simulation software 34 as illustrated at block 60 in FIG. 3. The trajectory simulation software module 34 executes algorithms in accordance with the following simulation software trajectory calculation model.

Simulation Software Trajectory Model

Coordinate Systems

Coordinate systems used in this illustrated model are standard, right-handed systems. The positive axes and rotations are defined following normal aerodynamics conventions. As illustrated in FIG. 12, for example, a body coordinate system of the type being described attached to an aircraft at its geometric center would have the positive X axis extending out the nose, the positive Y axis extending out the right wing, and the positive Z axis extending out the bottom of the aircraft, i.e. downwardly. The positive rotations yaw, pitch, and roll are defined using the standard right-hand rule. A positive rotation is defined as the direction that the fingers of the right hand curl when the thumb is pointed in the positive direction along the axis of rotation. Therefore, for the aircraft example used above, positive yaw is a positive rotation about the Z axis, positive pitch is a positive rotation about the Y axis, and positive roll is a positive rotation about the X axis. The order of rotation is also important. In the illustrated model, the order of rotation is yaw, pitch, and then roll. This model utilizes two coordinate systems of this type, an inertial system and a body system. Aerodynamic forces are illustratively calculated in the body coordinate system. The results of these aerodynamic forces are calculated and the results transformed into the inertial system.

Based upon the order of rotation just mentioned, the general rotation matrix may be calculated as follows:

$$R_z = \begin{bmatrix} \cos(\psi) & \sin(\psi) & 0 \\ -\sin(\psi) & \cos(\psi) & 0 \\ 0 & 0 & 1 \end{bmatrix}$$

Yaw Rotation Matrix $$R_y = \begin{bmatrix} \cos(\theta) & 0 & -\sin(\theta) \\ 0 & 1 & 0 \\ \sin(\theta) & 0 & \cos(\theta) \end{bmatrix}$$

Pitch Rotation Matrix $$R_x = \begin{bmatrix} 1 & 0 & 0 \\ 0 & \cos(\varphi) & \sin(\varphi) \\ 0 & -\sin(\varphi) & \cos(\varphi) \end{bmatrix}$$

Roll Rotation Matrix $$R(\psi, \theta, \varphi) = R_x \cdot R_y \cdot R_z$$

General Rotation Matrix

The fact that the order of rotation is important is illustrated mathematically by the order of the matrix multiplications in the general rotation matrix equation and the fact that matrix multiplication is not commutative. Multiplying a vector by the general rotation matrix corresponds to transforming the vector from the parent coordinate system to a new coordinate system derived by rotating the parent system by the specified yaw, pitch, and roll. If, on the other hand, it is desired to transform a vector in a coordinate system related to the parent system by a given yaw, pitch, and roll back to the parent coordinate system, the vector is multiplied by the inverse of the general rotation matrix which in this illustrated embodiment is the transpose of the matrix.

Equations of Motion The illustrated trajectory model uses two state arrays, y and yd. The array yd represents the first derivatives of y with respect to time. The following two tables, Table 1 and Table 2, describe the elements of y and yd. The fact that these state arrays express some state variables in the inertial system and some in the body system requires that certain conversions be performed as part of each time integration update. Two conversions of this type are disclosed. The first conversion includes transforming the velocity components from the body system (y[6], y[7], and y[8]) into the inertial system. The results of this transformation are assigned to yd[0], yd[1], and yd[2], respectively. The second conversion includes transforming the body rotation rates expressed with respect to the body coordinate axes (y[9], y[10], and y[11]) into yaw, pitch, and roll rates. The results of this transformation are assigned to yd[3], yd[4], and yd[5]. The derivation of the equations for converting body rotation rates to yaw, pitch, and roll rates will follow below.

TABLE 1

| Element | Description | Coordinate System | Units |
|---------|-------------|-------------------|-------|
| y[0] | X Coordinate | Inertial | m |
| y[1] | Y Coordinate | Inertial | m |
| y[2] | Z Coordinate | Inertial | m |
| y[3] | Yaw Angle | Inertial | rad |
| y[4] | Pitch Angle | Inertial | rad |
| y[5] | Roll Angle | Inertial | rad |
| y[6] | X Velocity | Body | m/sec |
| y[7] | Y Velocity | Body | m/sec |
| y[8] | Z Velocity | Body | m/sec |
| y[9] | Angular Rate about X axis | Body | rad/sec |
| y[10] | Angular Rate about Y axis | Body | rad/sec |
| y[11] | Angular Rate about Z axis | Body | rad/sec |

TABLE 2

| Element | Description | Coordinate System | Units |
|---------|-------------|-------------------|-------|
| yd[0] | X Velocity | Inertial | m/s |
| yd[1] | Y Velocity | Inertial | m/s |
| yd[2] | Z Velocity | Inertial | m/s |
| yd[3] | Yaw Angle Rate | Inertial | rad/s |
| yd[4] | Pitch Angle Rate | Inertial | rad/s |
| yd[5] | Roll Angle Rate | Inertial | rad/s |
| yd[6] | X Acceleration | Body | m/sec$^2$ |
| yd[7] | Y Acceleration | Body | m/sec$^2$ |
| yd[8] | Z Acceleration | Body | m/sec$^2$ |
| yd[9] | Angular Acceleration about X axis | Body | rad/sec$^2$ |
| yd[10] | Angular Acceleration about Y axis | Body | rad/sec$^2$ |
| yd[11] | Angular Acceleration about Z axis | Body | rad/sec$^2$ |

The equations of motion which are the basis of the expendable countermeasure trajectory model implemented by the trajectory simulation software 34 are formulated for a rigid body with six degrees of freedom (6-DOF). Three of the degrees of freedom relate to the translation of the body center of gravity. The other three degrees of freedom relate to the rotation of the body about its center of gravity. Note that while translations are vector quantities, general rotations are not. This is an important factor in the discussion of the equations of motion below. Although the equations are for a 6-DOF model, not all of the degrees of freedom are used in the illustrated embodiment.

The expendable countermeasure trajectory input data file determines whether three or five degrees of freedom are used. Conventional pyrotechnic type expendables are illustratively modeled using only three degrees of freedom because of the lack of any rotational aerodynamic coefficient data. Expendable countermeasures with solid bodies for which rotational aerodynamic coefficient measurements can be made are illustratively modeled using five degrees of freedom. The degree of freedom that is omitted in the illustrative embodiment is the roll due to the lack of roll moment data for the expendable. If such roll moment data is available, relatively minor changes to the software may be made to implement the roll capability.

The trajectory model expresses the rates of change of the expendable's motion vectors in the flare body-fixed coordinate system. This is not to say, for example, that the velocity is measured in the body coordinate system since the velocity of a body cannot be measured with respect to itself. The model represents rates of change of motion variables using the basis vectors of the body coordinate system. These basis vectors are defined in the parent inertial coordinate system. The question then becomes how to determine an absolute rate of change for a quantity expressed in some coordinate system that is rotating relative to the inertial system. The following description provides an answer to this question.

Let XYZ be an inertial coordinate system and X'Y'Z' be a coordinate system which has the same origin as XYZ. In addition, assume that X'Y'Z' rotates about its origin with angular velocity $\overline{\Omega}$. Unlike the general rotations mentioned earlier, $\overline{\Omega}$ is a vector quantity because infinitesimal rotations are vector quantities. Thus $\overline{\Omega}$ can be written as $(\Omega_X, \Omega_Y, \Omega_Z)$ where $\Omega_X$ is the instantaneous rotation rate of X'Y'Z' about X, $\Omega_Y$ is the instantaneous rotation rate of X'Y'Z' about Y, and $\Omega_Z$ is the instantaneous rotation rate of X'Y'Z' about Z.

Let $\overline{A}$ be a vector written in terms of the basis vectors of the rotating system X'Y'Z'.

$$\left(\frac{d\overline{A}}{dt}\right)_r \equiv$$

the time rate of change of $\overline{A}$ if the rotation of $X'Y'Z'$ is ignored Then the time rate of change of $\overline{A}$ as viewed from XYZ is given by the following equation:

$$\frac{d\overline{A}}{dt} = \left(\frac{d\overline{A}}{dt}\right)_r + \overline{\Omega} \times \overline{A} \qquad (2.2\text{-}1)$$

Equation 2.2-1 gives the absolute rate of change of $\overline{A}$ with respect to the inertial system. However, the rate of change is expressed in the rotating coordinate system. The cross product term from the right side of equation 2.2-1 results from the rotation of X'Y'Z'. As in this example, the subscript r indicates the rate of change of a vector expressed in terms of a rotating system which ignores the rotation of the system.

The following is used at various locations in the remainder of the description of the trajectory motion model. Absolute rates of change expressed in the body coordinate system are calculated using equation 2.2-1. Otherwise, the laws of classical dynamics cannot be applied. The letters U, V, and W refer to the X, Y, and Z axes of the flare's body coordinate system. The subscripts u, v, and w are used to indicate the components of a vector along U, V, and W.

The model of the flare's motion primarily consists of two vector equations. One equation governs translations, and the other equation governs rotations.

$$\overline{F} = m\left(\frac{d^2(\overline{r_c})}{dt^2}\right) \qquad (2.2\text{-}2)$$

$$\overline{M} = \frac{d\overline{H}}{dt} \qquad (2.2\text{-}3)$$

All the quantities in equations 2.2-2 and 2.2-3 are expressed in the body coordinate system. $\overline{F}=(F_u, F_v, F_w)$ represents the external forces acting upon the center of gravity of the flare, m is the mass of the flare, and $$\frac{d^2(\overline{r_c})}{dt^2}$$

is the absolute acceleration vector of the center of gravity of the flare. The vector $\overline{M}=(M_u, M_v, M_w)$ represents the external moments applied to the flare, and the vector $$\frac{d\overline{H}}{dt}$$

represents the absolute rate of change of the flare's angular momentum.

Let $\overline{V}=(u, v, w)$ be the absolute velocity vector of the flare in the body coordinate system, and $\overline{\Omega}=(p, q, r)$ be the angular velocity of the body coordinate system.

$$\frac{d^2(\overline{r_c})}{dt^2} = \left(\frac{d\overline{V}}{dt}\right)_r + \overline{\Omega} \times \overline{V} \qquad (2.2\text{-}4)$$

$$\left(\frac{d\overline{V}}{dt}\right)_r = \left(\frac{du}{dt}, \frac{dv}{dt}, \frac{dw}{dt}\right) \qquad (2.2\text{-}5)$$

Equation 2.2-4 follows directly from applying equation 2.2-1. Equation 2.2-5 gives the acceleration vector of the flare ignoring the rotation of the body coordinate system.

$$\overline{\Omega} \times \overline{V} = \begin{vmatrix} \hat{i} & \hat{j} & \hat{k} \\ p & q & r \\ u & v & w \end{vmatrix} = (qw-rv)\hat{i} + (ru-pw)\hat{j} + (pv-qu)\hat{k} \qquad (2.2\text{-}6)$$

Combining the results from equations 2.2-4, 2.2-5, and 2.2-6 and substituting into equation 2.2-2 yields the following equations:

$$F_u = m\left(\frac{du}{dt} + qw - rv\right) \qquad (2.2\text{-}7)$$

$$F_v = m\left(\frac{dv}{dt} + ru - pw\right) \qquad (2.2\text{-}8)$$

$$F_w = m\left(\frac{dw}{dt} + pv - qu\right) \qquad (2.2\text{-}9)$$

The external force vector, $(F_u, F_v, F_w)$, consists of two types of forces, gravitational and aerodynamic. $\overline{G}$ can be resolved along the coordinate axes of the body coordinate system. This results in the expression $\overline{G}=(G_u, G_v, G_w)$. If $\overline{FA}=(FA_u, FA_v, FA_w)$ represents the external aerodynamic forces, then the translational equations of motion are as follows:

$$FA_u = m\left(\frac{du}{dt} + qw - rv - G_u\right) \qquad (2.2\text{-}10)$$

$$FA_v = m\left(\frac{dv}{dt} + ru - pw - G_v\right) \qquad (2.2\text{-}11)$$

$$FA_w = m\left(\frac{dw}{dt} + pv - qu - G_w\right) \quad (2.2\text{-}12)$$

The model does not use the translational equations of motion in the form given above. To obtain the form used in the model, solve equations 2.2-10, 2.2-11, and 2.2-12 for $$\frac{du}{dt}, \frac{dv}{dt}, \text{ and } \frac{dw}{dt}.$$

This yields the following equations:

$$\frac{du}{dt} = \frac{FA_u}{m} - qw + rv + G_u \quad (2.2\text{-}13)$$

$$\frac{dv}{dt} = \frac{FA_v}{m} - ru + pw + G_v \quad (2.2\text{-}14)$$

$$\frac{dw}{dt} = \frac{FA_w}{m} - pv + qu + G_w \quad (2.2\text{-}15)$$

Next is the derivation of equation 2.2-3.

$$\overline{H} = \begin{bmatrix} H_u \\ H_v \\ H_w \end{bmatrix} = \begin{bmatrix} I_{uu} & I_{uv} & I_{uw} \\ I_{vu} & I_{vv} & I_{vw} \\ I_{wu} & I_{wv} & I_{ww} \end{bmatrix} \cdot \begin{bmatrix} p \\ q \\ r \end{bmatrix} \quad (2.2\text{-}16)$$

The 3×3 matrix in equation 2.2-16 contains the products of inertia and the moments of inertia for the flare. The elements $I_{uu}$, $I_{vv}$ and $I_{ww}$ are the moments of inertia. The remaining elements are products of inertia. Since the body coordinate system is being used, all of the elements of this matrix are constant. Because of the symmetry of the expendable countermeasure, it is reasonable to assume that the body reference system constitutes a set of principal axes (that is, all products of inertia with respect to this system are zero). This results in the simplification of equation 2.2-16 which follows.

$$\overline{H} = \begin{bmatrix} H_u \\ H_v \\ H_w \end{bmatrix} = \begin{bmatrix} I_{uu} & 0 & 0 \\ 0 & I_{vv} & 0 \\ 0 & 0 & I_{ww} \end{bmatrix} \cdot \begin{bmatrix} p \\ q \\ r \end{bmatrix} \quad (2.2\text{-}17)$$

$$H_u = I_{uu} p \quad (2.2\text{-}18)$$

$$H_v = I_{vv} q \quad (2.2\text{-}19)$$

$$H_w = I_{ww} r \quad (2.2\text{-}20)$$

To calculate $$\frac{d\overline{H}}{dt},$$

one must again apply equation 2.2-1.

$$\frac{d\overline{H}}{dt} = \left(\frac{d\overline{H}}{dt}\right)_r + \overline{\Omega} \times \overline{H} \quad (2.2\text{-}21)$$

$$\left(\frac{d\overline{H}}{dt}\right)_r = \left(\frac{dH_u}{dt}, \frac{dH_v}{dt}, \frac{dH_w}{dt}\right) \quad (2.2\text{-}22)$$

$$\frac{dH_u}{dt} = I_{uu} \frac{dp}{dt} \quad (2.2\text{-}23)$$

$$\frac{dH_v}{dt} = I_{vv} \frac{dq}{dt} \quad (2.2\text{-}24)$$

$$\frac{dH_w}{dt} = I_{ww} \frac{dr}{dt} \quad (2.2\text{-}25)$$

To calculate $\overline{\Omega} \times \overline{H}$, one must again evaluate a determinant.

$$\overline{\Omega} \times \overline{H} = \begin{vmatrix} \hat{i} & \hat{j} & \hat{k} \\ p & q & r \\ I_{uu} p & I_{vv} q & I_{ww} r \end{vmatrix} \quad (2.2\text{-}26)$$

$$= (I_{ww} - I_{vv}) qr \hat{i} + (I_{uu} - I_{ww}) pr \hat{j} + (I_{vv} - I_{uu}) pq \hat{k}$$

Using equations 2.2-22 through 2.2-26 to substitute into equation 2.2-21 gives equations 2.2-27 through 2.2-29.

$$M_u = I_{uu} \frac{dp}{dt} + (I_{ww} - I_{vv}) qr \quad (2.2\text{-}27)$$

$$M_v = I_{vv} \frac{dq}{dt} + (I_{uu} - I_{ww}) pr \quad (2.2\text{-}28)$$

$$M_w = I_{ww} \frac{dr}{dt} + (I_{vv} - I_{uu}) pq \quad (2.2\text{-}29)$$

The equations used in the model follow from the previous three equations by solving for $$\frac{dp}{dt}, \frac{dq}{dt}, \text{ and } \frac{dr}{dt}.$$

The rotational equations of motion used by the model are listed below.

$$\frac{dp}{dt} = \frac{M_u - (I_{ww} - I_{vv}) qr}{I_{uu}} \quad (2.2\text{-}30)$$

$$\frac{dq}{dt} = \frac{M_v - (I_{uu} - I_{ww}) pr}{I_{vv}} \quad (2.2\text{-}31)$$

$$\frac{dr}{dt} = \frac{M_w - (I_{vv} - I_{uu}) pq}{I_{ww}} \quad (2.2\text{-}32)$$

Equations 2.2-13, 2.2-14, 2.2-15, 2.2-30, 2.2-31, and 2.2-32 together form a system of differential equations. The model then derives a second system of differential equations by expressing the solutions for equations 2.2-13, 2.2-14, and 2.2-15 in terms of the inertial coordinate system and the solutions for equations 2.2-30, 2.2-31, and 2.232 in terms of time rates of change of yaw, pitch, and roll. For the solutions to equations 2.2-13, 2.2-14, and 2.2-15 this is simply a matter of applying the general rotation matrix. However, the case is not so simple for the solutions to equations 2.230, 2.2-31, and 2.2-32.

Figure 6:
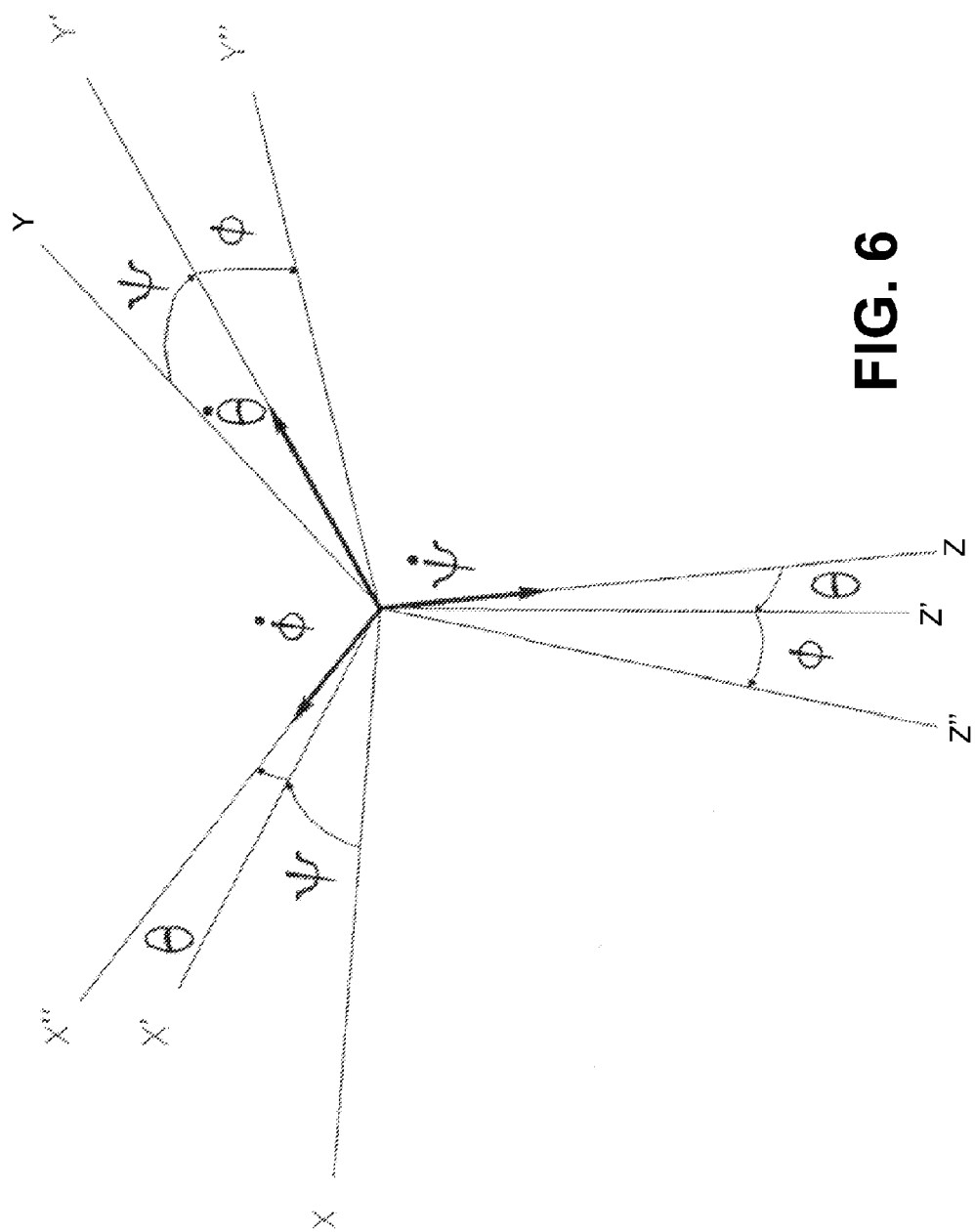
FIG. 6 is diagram illustrating how to resolve vector quantities onto a body coordinate axis in the trajectory model used by the countermeasure trajectory simulation software module.

Although $$\frac{d\psi}{dt}, \frac{d\theta}{dt}, \text{ and } \frac{d\varphi}{dt}$$

are vector quantities and form a set of basis vectors for $\overline{\Omega}$, they do not form an orthogonal basis for $\overline{\Omega}$. This is to be expected because yaw, pitch and roll are not independent. FIG. 6 illustrates the use of Euler angular velocity vectors to resolve $$\frac{d\psi}{dt}, \frac{d\theta}{dt}, \text{ and } \frac{d\varphi}{dt}$$

onto the body coordinate axes.

The results of resolving $$\frac{d\psi}{dt}, \frac{d\theta}{dt}, \text{ and } \frac{d\varphi}{dt}$$

onto the body coordinate axes are given by the following equations:

$$p = \frac{d\varphi}{dt} - \frac{d\psi}{dt}\sin(\theta)$$

$$q = \frac{d\theta}{dt}\cos(\varphi) + \frac{d\psi}{dt}\cos(\theta)\sin(\varphi)$$

$$r = \frac{d\psi}{dt}\cos(\theta)\cos(\varphi) - \frac{d\theta}{dt}\sin(\varphi)$$

If these equations are solved for $$\frac{d\psi}{dt}, \frac{d\theta}{dt}, \text{ and } \frac{d\varphi}{dt},$$

then the equations 2.2-33, 2.2-34 and 2.2-35 are obtained as follows:

$$\frac{d\psi}{dt} = \frac{r\cos(\varphi) + q\sin(\varphi)}{\cos(\theta)} \quad (2.2\text{-}33)$$

$$\frac{d\theta}{dt} = q\cos(\varphi) - r\sin(\varphi) \quad (2.2\text{-}34)$$

$$\frac{d\varphi}{dt} = p + (r\cos(\varphi) + q\sin(\varphi))\tan(\theta) \quad (2.2\text{-}35)$$

The illustrative trajectory model uses the equations above with the exception of equation 2.2-35. For computational efficiency, the illustrative trajectory model replaces equation 2.2-35 with the equivalent equation 2.2-36.

$$\frac{d\varphi}{dt} = p + \frac{d\psi}{dt}\sin(\theta) \quad (2.2\text{-}36)$$

The illustrative trajectory model uses the following three aerodynamic coefficients to calculate the external aerodynamic forces and the external moments acting upon the flare:

$C_A$=Coefficient of total axial force.

$C_N$=Coefficient of total normal force.

$C_{M_o}$=Total moment coefficient for p=q=r=0.

Figure 7:
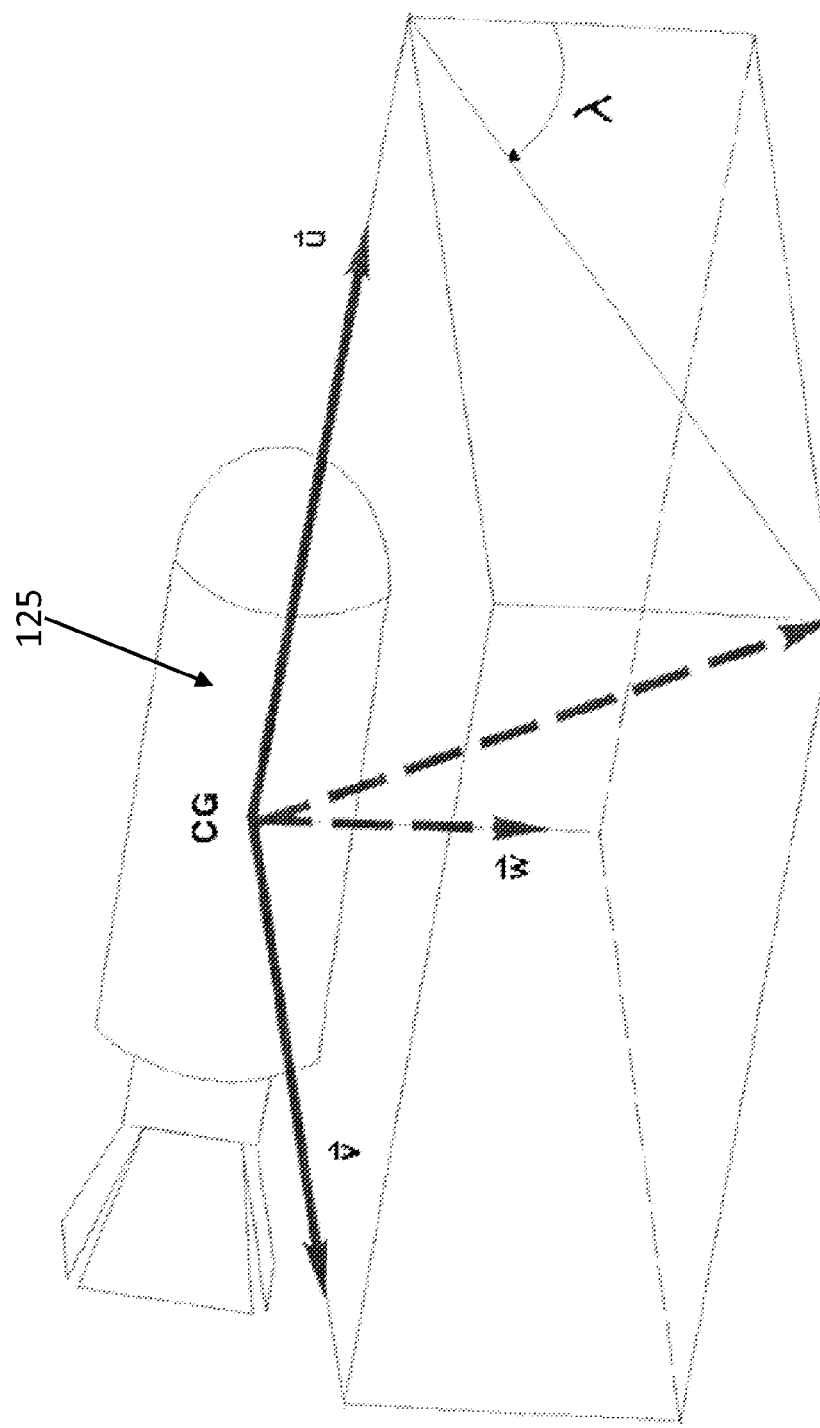
FIG. 7 is a diagrammatical view of a falling flare showing vectors which define a body-fixed coordinate system originating from the flare's center of gravity.

These coefficients are functions of both mach number and total angle of attack (AoA). The following is a set of definitions relevant to the illustrative trajectory model as illustrated in FIG. 7. The illustrated expendable countermeasure is a flare 125.

cg=Center of gravity of the flare.

$\overline{V}$=Flare velocity vector (u,v,w).

$\alpha$=Pitch AoA,$\angle$between $\overline{u}$ and $\overline{u}+\overline{w}$.

$\beta$=Yaw AoA,$\angle$between $\overline{u}$ and $\overline{u}+\overline{v}$.

$\Gamma$=Total AoA,$\angle$between $\overline{u}$ and $\overline{V}$.

The incidence plane is the plane defined by the vectors $\overline{U}$ and $\overline{V}$. The total moment and the normal force act in the incidence plane. The vectors representing the total moment and the normal force originate at the center of gravity of flare 125.

To write the equations for the external forces and moments, one will need the following definitions:

$V = |\overline{V}|$ $\rho$ = Atmospheric density.

$S \equiv$ reference area of the flare.

$D \equiv$ Diameter of the flare.

$Q = \frac{1}{2}\rho V^2$ (dynamic pressure)

Let $\overline{F}_{Normal}$=(0, $FA_v$, $FA_w$) represent the aerodynamic normal force acting upon the flare. Then, $\overline{F}_{Normal}$ will be in the VW-plane and will have the opposite direction as the projection of $\overline{V}$ into the VW-plane, $\overline{V}_{vw}$. Using the coefficient of aerodynamic normal force and resolving this normal force along the V and W axes, gives equations 2.2-38 and 2.2-39. Since the aerodynamic axial force is directed along the negative U-axis, equation 2.2-37 follows from an application of the coefficient of aerodynamic axial force.

Figure 8:
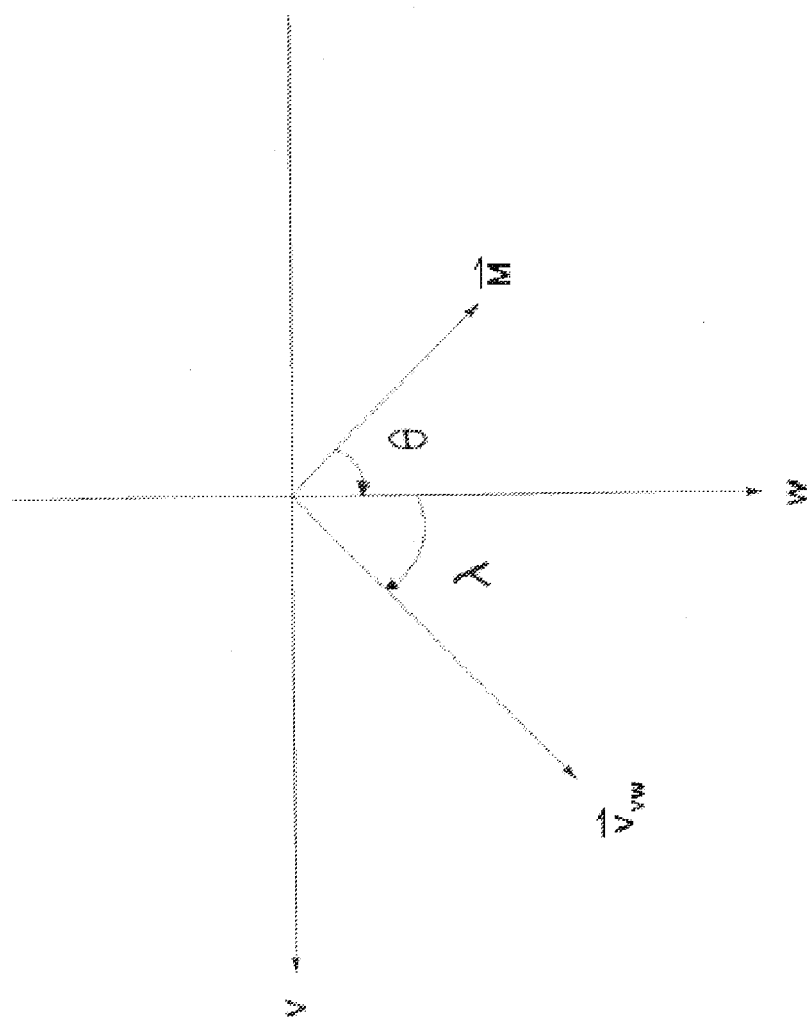
FIG. 8 illustrates normal forces and moments acting on a falling flare.

Reference is now made to the diagram shown in FIG. 8. In FIG. 8, the nose of the flare 125 is pointing up out of the page from the origin of the diagram.

$FA_u = -C_A QS$ (2.2-37)

$FA_v = C_N \sin(\lambda) QS$ (2.2-38)

$FA_w = -C_N \cos(\lambda) QS$ (2.2-39)

The derivation for the external moments is more involved. To begin, assume that the angular rates p, q, and r are all zero. Because of the nature of the flare, it is also assumed that the roll moment about the U-axis is zero. Therefore, the total moment vector is $\overline{M}$=(0,$M_v$,$M_w$).

The vector $\overline{M}$ is perpendicular to the incidence plane. Thus, there exists and angle θ such that λ+θ=π/2. Resolving $\overline{M}$ along the body coordinate axes gives the following equations:

$$M_u = 0 \quad (2.2\text{-}40)$$

$$M_v = C_{M_0}\sin(\theta)QSD \quad (2.2\text{-}41)$$

$$M_w = -C_{M_0}\cos(\theta)QSD \quad (2.2\text{-}42)$$

It is more convenient to have equations 2.2-40, 2.2-41, and 2.2-42 expressed in terms of λ rather than θ. To accomplish this, substitute θ=π/2−λ and simplify using trigonometric identities. This results in the following equations:

$$M_u = 0 \quad (2.2\text{-}43)$$

$$M_v = C_{M_0}\cos(\lambda)QSD \quad (2.2\text{-}44)$$

$$M_w = -C_{M_0}\sin(\lambda)QSD \quad (2.2\text{-}45)$$

The terms $C_{M_0}\cos(\lambda)$ and $-C_{M_0}\sin(\lambda)$ are the pitch moment and yaw moment coefficients for p=q=r=0 respectively.

For the model to be useful, moment coefficients are calculated for angular rates that are not zero. To accomplish this, two additional assumptions are made. First, for fixed mach and fixed total angle of attack, the pitch moment coefficient is a function of q. Second, for fixed mach and fixed total angle of attack, the yaw moment coefficient is a function of r. This allows both the pitch moment coefficient and the yaw moment coefficient to be approximated by a Taylor polynomial in q and r respectively. The illustrated trajectory model uses a first degree polynomial in each case.

In missile aerodynamics, the first partial derivative of the pitch moment coefficient with respect to q is not measured. Rather, the first partial derivative of the pitch moment coefficient is measured with respect to $$q\frac{D}{2V}.$$

Likewise, the first partial derivative of the yaw moment coefficient is measured with respect to $$r\frac{D}{2V}.$$

The model calculates the first partials with request to q and r by multiplying by the factor $$\frac{D}{2V}.$$

Because of the symmetry of the flare, the two partial derivatives referred to above are equal.

Inserting these Taylor approximations into equations 2.2-44 and 2.2-45 gives the following equations for external moments:

$$M_u = 0 \quad (2.2\text{-}43)$$

$$M_v = \left[C_{M_0}\cos(\lambda) + \dot{C}_{M_\alpha}\left(\frac{D}{2V}\right)q\right]QSD \quad (2.2\text{-}47)$$

$$M_w = \left[-C_{M_0}\sin(\lambda) + \dot{C}_{M_\beta}\left(\frac{D}{2V}\right)r\right]QSD \quad (2.2\text{-}48)$$

$$\dot{C}_{M_\alpha} \equiv \frac{\partial}{\partial\left(q\frac{D}{2V}\right)}(C_M\cos(\lambda)) \quad (2.2\text{-}49)$$

$$\dot{C}_{M_\beta} \equiv \frac{\partial}{\partial\left(r\frac{D}{2V}\right)}(C_M\sin(\lambda)) \quad (2.2\text{-}50)$$

Next, the illustrated trajectory model solves the two systems of differential equations described earlier using the fourth order Runge-Kutta algorithm. This updates the motion of the flare by one time step. Finally, the illustrated trajectory model converts the data back to the inertial coordinate systems for use elsewhere in the flare model. This trajectory data is stored in storage device 14 and/or memory 16 for further processing by the 2-D plot software module 38, the 3-D plat software module 40, or the animation software module 42 as discussed below. The trajectory data may also be exported for use in other simulation models as discussed herein.

Once the simulation is executed, the user may view the simulation results in a plurality of different ways as illustrated in FIG. 5. When the 2-D trajectory plot option is selected, the two dimensional (2-D) plot software 138 processes output data from the trajectory simulation software 34 to produce a 2-D plot display and input module 152 shown in FIG. 14. The 2-D plot trajectory is displayed in region 154. The 2-D plot illustratively shows the movement of aircraft along line 156 and the movement of the dispensed countermeasure or decoy along line 158. The 2-D plot module 152 allows the user to change the bottom axis of the plot at selection area 160 and to change the left axis of the plot at selection area 162. The user can change the items to be plotted at input area 164 and set the position reference system at input area 166. The user may also select the units of measure at input area 168. The user may exit the 2-D plot module 152 by selecting the "Exit" button 170. In one illustrated embodiment, the disclosed system may be implemented in C++ for example. Illustratively, the 2-D charts like the one in FIG. 14 may be implemented using chart software.

Figure 15:
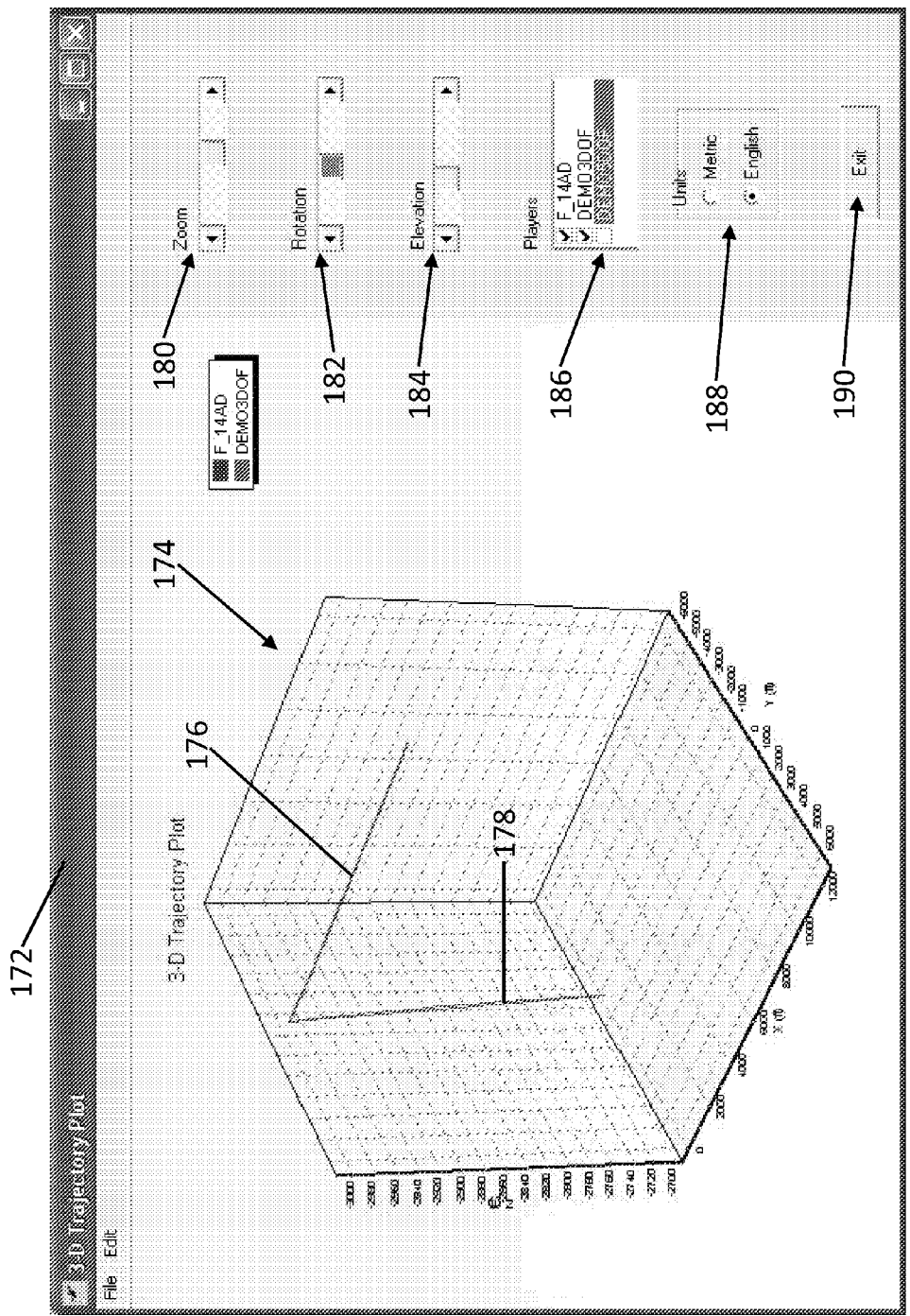
FIG. 15 illustrates a three-dimensional trajectory plot for an aircraft dispensed countermeasure.

When a user selects to display a three dimensional (3-D) trajectory plot, 3-D plot software 40 processes output data from the trajectory simulation software 34 to generate the 3-D trajectory plot display and input module shown in FIG. 15. The 3-D plot module 172 is illustratively displayed on the GUI display 24. The three dimensional trajectory plot is displayed in region 174. Illustratively, the trajectory of the aircraft is shown along line 176 and the trajectory of the dispensed countermeasure is shown along line 178. The user may control the zoom, rotation, and elevation of the 3-D trajectory plot using controls 180, 182 and 184, respectively. The user may adjust which items are displayed on the 3-D trajectory plot at input location 186. The user may adjust the units of measure at location 188. The user can exit the 3-D trajectory plot module 172 by selecting the "Exit" button 190. Illustratively, the 3-D charts like the one shown in FIG. 15 may be implemented using chart software.

Figure 16:
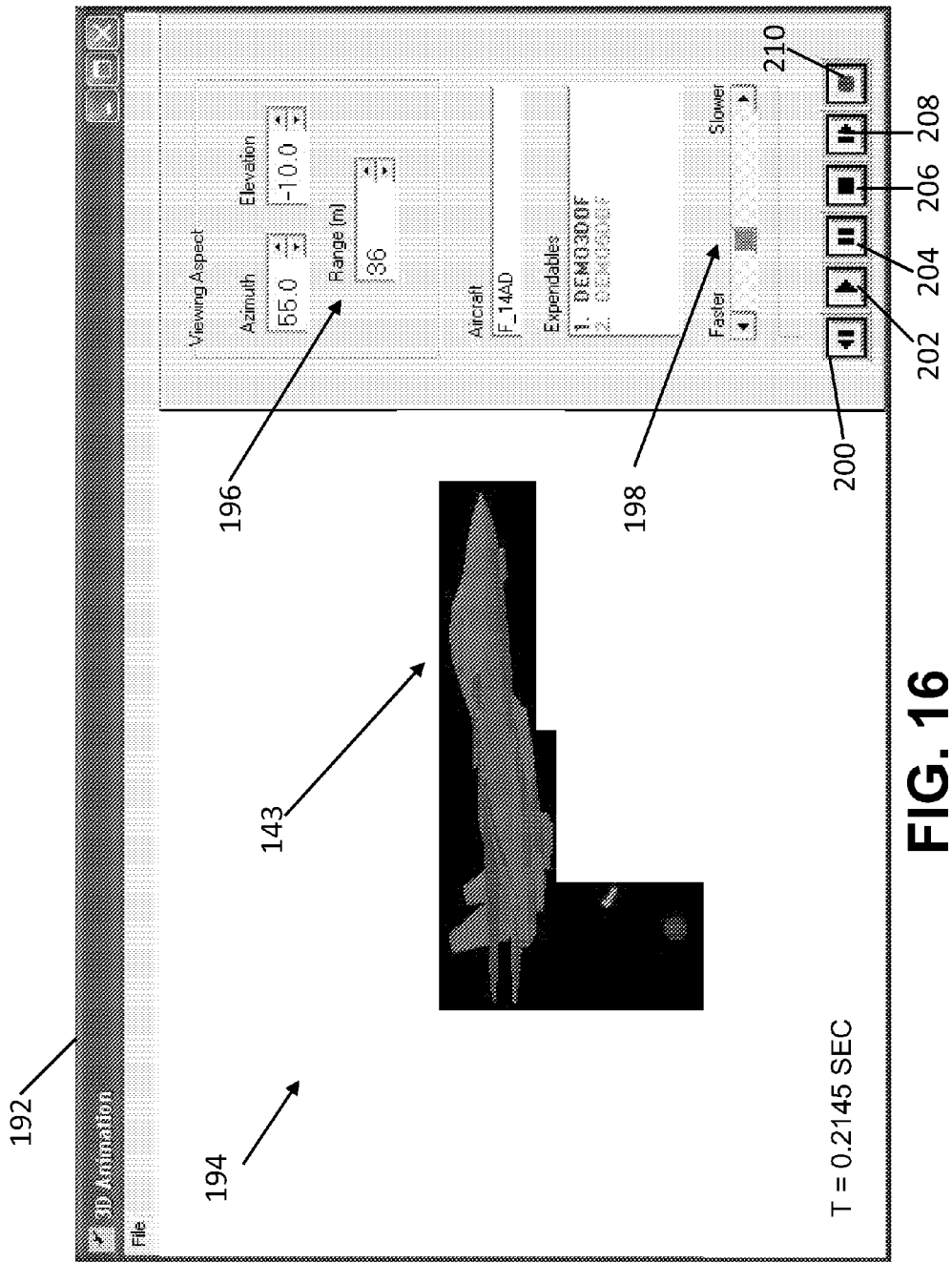
FIG. 16 illustrates a display and input module for showing a 3-D animation illustrating dispensing of the countermeasures from the aircraft.

When the user selects to view a 3-D animation of the simulation results, animation software 42 processes the output data from trajectory calculation software 34 to provide 3-D animation display and input module 192 shown in FIG. 16. The 3-D animation module 192 is illustratively displayed on GUI display 24. An animated movie showing the simulation is shown in region 194. The user may change the viewing aspect including azimuth, elevation and range using inputs at location 196. The user may change the speed of the animation using input 198. The animation is controlled using a "Rewind" button 200, a "Play" button 202, a "Pause" button 204, a "Stop" button 206, a "Fast Forward" button 208, and a "Record" button 210. If the "Record" button 210 is selected the animation software 42 saves the animation as an audio/video interleave file (AVI), or suitable other file format for use in other applications. For instance, the video may be saved and used in a subsequent presentation regarding the results of the simulation for the particular aircraft and dispenser configurations.

Figure 17:
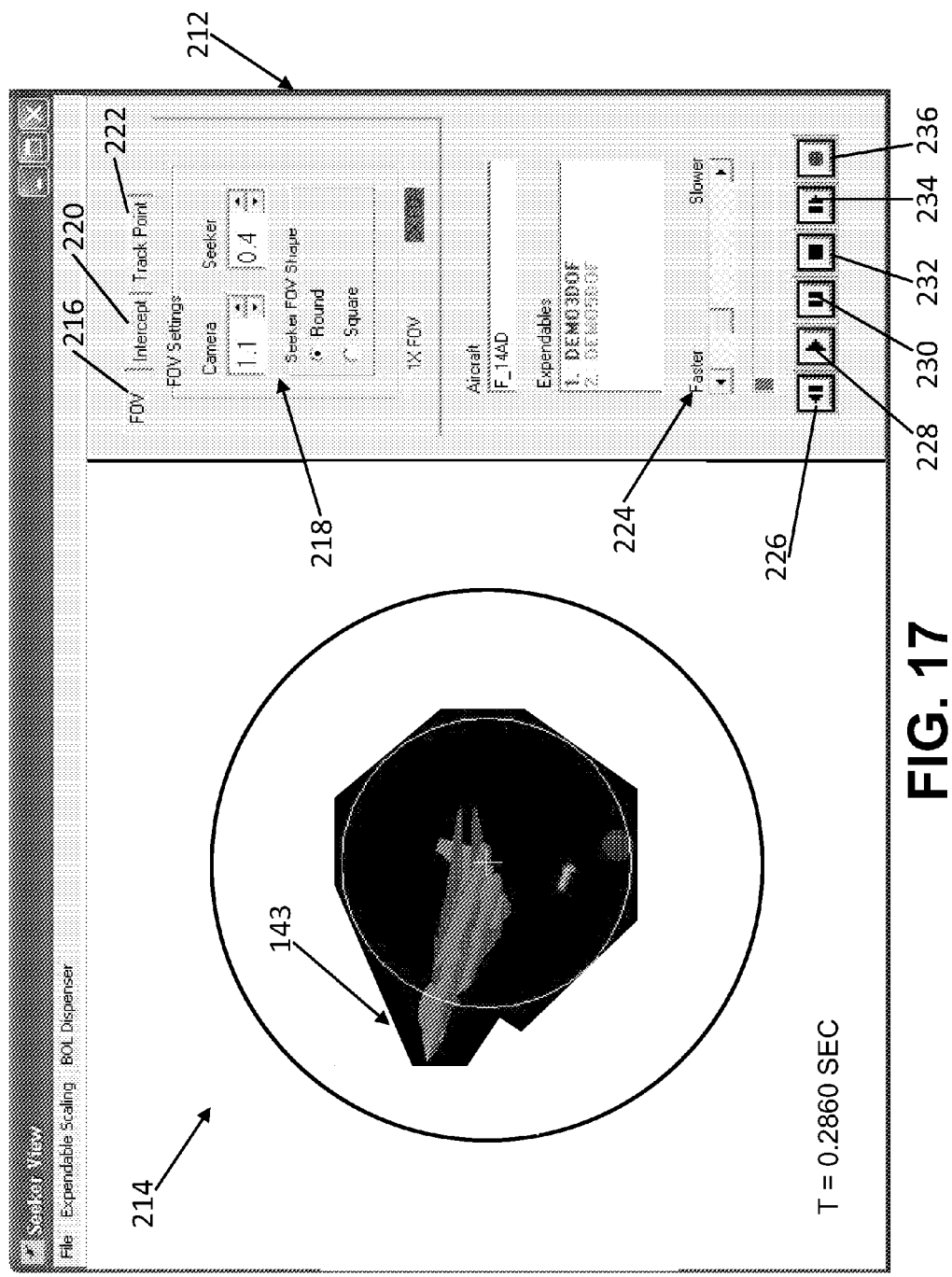
FIG. 17 is a display screen and input module illustrating a seeker view animation which simulates a countermeasure dispensing sequence from the point of view of a heat seeking missile approaching the aircraft as the countermeasures are being dispensed.

The animation software 42 may also provide a seeker view display and input module 212 by processing output data generated by the trajectory simulation software 34. The seeker view module 212 is illustratively displayed on the GUI display 24 as illustrated in FIG. 17. Similar to FIG. 16, an animation is displayed at location 214 of the display module 212. In the seeker view embodiment, the animation is played from the point of view of a missile approaching the aircraft 143. The aircraft is a target and the field of view or camera location changes as the missile approaches the target aircraft. The field of view settings can be changed by selecting button 216 and then making adjustments in area 218. The speed of the missile can be set by selecting the "Intercept" button 220. The location of the cross hairs shown in the animation can be changed by selecting the "Track Point" button 222. After selecting the "Track Point" button 222, the user can move the cross hairs (+) to a particular target location on the aircraft and that location will then be displayed in region 214 as the center of the target. Speed control and playback control buttons are also shown in FIG. 17 similar to FIG. 16 above. Specifically, the seeker view animation is controlled using a "Rewind" button 226, a "Play" button 228, a "Pause" button 230, a "Stop" button 232, a "Fast Forward" button 234, and a "Record" button 236. If the "Record" button 236 is selected the animation software 42 saves the seeker view animation as an audio/video interleave file (AVI), or suitable other file format, for use in other applications.

In an illustrated embodiment, the animation software module 42 used to display the animation described above with reference to FIGS. 16 and 17 may include a graphics library and graphics application software.

Figure 18:
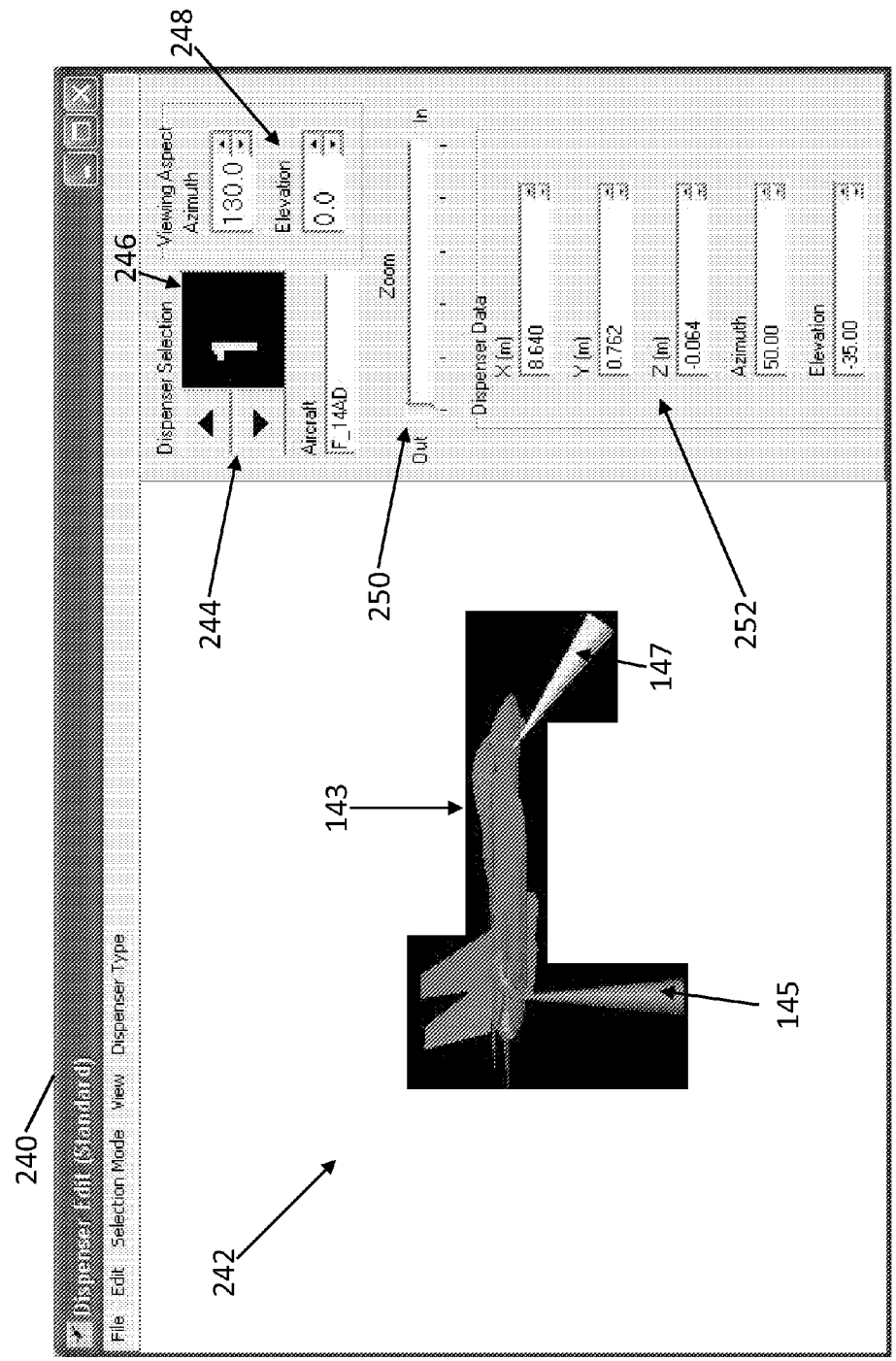
FIG. 18 is a display and input module displayed on the graphical user interface used by a user to add countermeasure dispensers to the aircraft or modify countermeasure dispensers of the aircraft before running the simulation.

If the user selects to add or modify the countermeasure dispensers at block 36 of FIG. 3 above, the dispenser modification software 35 generates a dispenser display and edit module 240 shown in FIG. 18. The dispenser edit module 240 is illustratively displayed on GUI display 24. The particular aircraft 143 and dispense direction indicators 145, 147 are displayed in area 242 similar to area 142 shown in FIG. 13. Also similar to FIG. 13, the user can make a dispenser selection by selecting arrows in region 244. The particular dispense direction indicator 147 being highlighted in the image 242 is shown at location 246 (Dispenser 1). The user may change the viewing aspect of image using inputs at location 248. The user can zoom in or out on the displayed image using "Zoom Control" 250.

The dispenser data for Dispenser 1 is illustrated at location 252. The dispenser data may be modified by entering new values. In FIG. 18, the user has selected to modify Dispenser 1 compared to its position shown in FIG. 13. The viewer has also changed the viewing aspect using controls 240 compared with the view in FIG. 13 so that the azimuth is 130° and the elevation is 0. As shown in FIG. 18, the user has moved Dispenser 1 to a location positioned 8.640 meters towards the nose of the aircraft, 0.762 meters toward the right wing of the aircraft, and 0.064 meters above the centerline of the aircraft.

The azimuth of Dispenser 1 is oriented at 50° and the elevation is −35° as shown at location 252 in FIG. 18. It is understood that these values for the X position, Y position, Z position, azimuth and elevation may be adjusted to any desired position by the user. Once the changes are made, the user can store the changes for the particular dispenser in the database 32 for use by the trajectory simulation software 34. As discussed above, additional dispensers may also be added to the particular aircraft using the dispenser edit module 248. When the dispensers are added, the user inputs dispenser data in region 252 for the new dispenser. New predicted dispense direction indicators similar to dispense direction indicators 145, 147 are then displayed in area 242.

While this disclosure has been described as having exemplary designs and embodiments, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A method implemented on a computing device for simulating trajectories of objects dispensed from a moving aircraft, the computing device having a processor capable of accessing a memory and at least one input device, the method comprising:
    storing object dispenser data in a database in the memory of the computing device, the object dispenser data including locations and orientations of object dispensers linked to an aircraft;
    receiving input data from an input device to select an aircraft for the simulation;
    retrieving object dispenser data from the database stored in the memory of the computing device to determine a location and an orientation of at least one object dispenser relative to the selected aircraft;
    receiving input data from the input device to define flight conditions for the aircraft, the flight conditions including an inertial position in an inertial coordinate system, an inertial heading, and a flight speed of the aircraft;
    receiving input data from the input device to define an object dispense sequence for the at least one object dispenser; and
    calculating a trajectory for each object dispensed from the at least one object dispenser using the processor of the computing device.

2. The method of claim 1, wherein the computing device further includes a display, and the method further comprising displaying a representation of the calculated trajectory of the at least one dispensed object on the display.

3. The method of claim 2, wherein the representation of the calculated trajectory of the at least one dispensed object is displayed on the display as a two dimensional plot.

4. The method of claim 2, wherein the representation of the calculated trajectory of the at least one dispensed object is displayed on the display as a three dimensional plot.

5. The method of claim 2, wherein the representation of the calculated trajectory of the at least one dispensed object is displayed as an animation on the display showing relative movement of the at least one dispensed object with respect to the aircraft.

6. The method of claim 5, further comprising receiving input data from the input device to adjust a viewing aspect of the animation shown on the display.

7. The method of claim 1, further comprising receiving input data from the input device to modify at least one of a location and an orientation of an object dispenser relative to the aircraft.

8. The method of claim 7, wherein the location of the object dispenser is modified by changing its location along X, Y and Z axes of the aircraft.

9. The method of claim 8, wherein the location of the object dispenser is also modified by changing the azimuth and the elevation of the dispenser relative to the aircraft.

10. The method of claim 7, further comprising storing the modified dispenser location and orientation in the database in the memory of the computing device linked to the selected aircraft.

11. The method of claim 1, further comprising receiving input data from the input device to add at least one additional object dispenser at a new location and orientation relative to the aircraft.

12. The method of claim 11, further comprising storing the at least one additional object dispenser location and orientation in the memory of the computing device linked to the selected aircraft.

13. The method of claim 1, wherein the dispensed object is an expendable countermeasure.

14. The method of claim 13, wherein the dispensed object is an infrared flare.

15. The method of claim 1, wherein the dispensed object is one of a bomb and a sonobuoy.

16. The method of claim 1, further comprising transmitting the calculated trajectory of the at least one dispensed object to another computing device.

17. The method of claim 1, further comprising receiving maneuver data representing an aircraft maneuver to be executed during the simulation from the input device, the maneuver data including acceleration of the aircraft along an X axis, a Y axis, and a Z axis.

18. The method of claim 17, wherein the maneuver data further includes a roll rate for the aircraft maneuver, a start time for the aircraft maneuver, and a stop time for the aircraft maneuver.

19. The method of claim 1, further comprising receiving input data from the input device to set a wind speed before calculating the trajectory of the at least one dispensed object.

20. The method of claim 1, further comprising receiving input data from the input device to set a position reference system for the simulation.

21. The method of claim 20, wherein the position reference system is one of an inertial reference system, a drop point reference system, and an aircraft body reference system.

22. The method of claim 1, wherein the inertial position of the aircraft includes an X axis position, a Y axis position, and an altitude of the aircraft.

23. The method of claim 1, wherein the inertial heading includes yaw, pitch and roll of the aircraft relative to the Z axis, Y axis and X axis of the aircraft, respectively.

24. The method of claim 1, wherein the trajectory of the at least one dispensed object is calculated in the same inertial coordinate system used to define the flight conditions of the aircraft.

25. The method of claim 1, wherein the object dispense sequence sets the number of objects to be dispensed from each object dispenser during the simulation.

26. The method of claim 25, wherein the object dispense sequence also sets the timing for dispensing the objects from each object dispenser.

27. The method of claim 1, wherein the trajectory of each dispensed object is calculated using a trajectory model formulated for a rigid body with at least five degrees of freedom.

28. The method of claim 1, wherein the dispensed object is a projectile launched from the object dispenser.

29. The method of claim 1, wherein the dispensed object is gravity fed from the object dispenser.

30. The method of claim 1, wherein the calculating step calculates trajectories for objects dispensed from a plurality of different object dispensers on the selected aircraft.

31. The method of claim 1, further comprising displaying a dispense direction indicator for a plurality of objects dispensed from the at least one object dispenser on the selected aircraft based on the calculated trajectories for the plurality of dispensed objects.

32. A system for simulating trajectories of objects dispensed from a moving aircraft, the system comprising:
a display;
at least one user input device;
a processor operatively coupled to the display and the at least one input device;
a memory accessible by the processor;
an object dispenser database stored in the memory, the object dispenser database including object dispenser data indicating locations and orientations of a plurality of object dispensers linked to a plurality of aircraft; and
trajectory simulation software stored in the memory for execution by the processor, the trajectory simulation software including:
a first processing sequence for generating a graphical user interface to select an aircraft for the simulation;
a second processing sequence for retrieving object dispenser data from the database stored in the memory to determine a location and an orientation of at least one object dispenser relative to the selected aircraft;
a third processing sequence for generating a graphical user interface to define flight conditions for the aircraft, the flight conditions including an inertial position in an inertial coordinate system, an inertial heading, and a flight speed of the aircraft;
a fourth processing sequence for generating a graphical user interface to define a object dispense sequence for the at least one object dispenser; and
a fifth processing sequence for calculating a trajectory for each object dispensed from the at least one object dispenser.

33. The system of claim 32, further comprising a display software module stored in the memory for execution by the processor, the display software including a processing sequence to display a representation of the calculated trajectory of the at least one dispensed object on the display.

34. The system of claim 33, wherein the display software module displays the representation of the calculated trajectory of the at least one dispensed object on the display as a two dimensional plot.

35. The system of claim 33, wherein the display software module displays the representation of the calculated trajectory of the at least one dispensed object on the display as a three dimensional plot.

36. The system of claim 33, wherein the display software module displays the representation of the calculated trajectory of the at least one dispensed object as an animation on the display showing relative movement of the at least one dispensed object with respect to the aircraft.

37. The system of claim 32, wherein the trajectory simulation software further includes another processing sequence for generating a graphical user interface to modify at least one of a location and an orientation of an object dispenser relative to the aircraft.

38. The system of claim 37, wherein the location of the object dispenser is modified by changing its location along X, Y and Z axes of the aircraft.

39. The system of claim 37, wherein the orientation of the object dispenser is also modified by changing the azimuth and the elevation of the dispenser relative to the aircraft.

40. The system of claim 37, wherein the trajectory simulation software further includes another processing sequence for storing the modified dispenser location and orientation in the database in the memory of the computing device linked to the selected aircraft.

41. The system of claim 32, wherein the trajectory simulation software further includes another processing sequence for generating a graphical user interface to add at least one additional object dispenser at a new location and orientation relative to the aircraft.

42. The system of claim 41, wherein the trajectory simulation software further includes another processing sequence for storing the at least one additional object dispenser location and orientation in the memory of the computing device linked to the selected aircraft.

43. The system of claim 32, wherein the dispensed object is an expendable countermeasure.

44. The system of claim 43, wherein the dispensed object is an infrared flare.

45. The system of claim 32, wherein the dispensed object is one of a bomb and a sonobuoy.

46. The system of claim 32, wherein the trajectory simulation software further includes another processing sequence for transmitting the calculated trajectory of the at least one dispensed object to another computing device.

47. The system of claim 32, wherein the trajectory simulation software further includes another processing sequence for generating a graphical user interface to input maneuver data representing an aircraft maneuver to be executed during the simulation, the maneuver data including acceleration of the aircraft along an X axis, a Y axis, and a Z axis.

48. The system of claim 47, wherein the maneuver data further includes a roll rate for the aircraft maneuver, a start time for the aircraft maneuver, and a stop time for the aircraft maneuver.

49. The system of claim 32, wherein the trajectory simulation software further includes another processing sequence for generating a graphical user interface to set a wind speed before calculating the trajectory of the at least one dispensed object.

50. The system of claim 32, wherein the trajectory simulation software further includes another processing sequence for generating a graphical user interface to set a position reference system for the simulation.

51. The system of claim 50, wherein the position reference system is one of an inertial reference system, a drop point reference system, and an aircraft body reference system.

52. The system of claim 32, wherein the inertial position of the aircraft includes an X axis position, a Y axis position, and an altitude of the aircraft.

53. The system of claim 32, wherein the inertial heading includes yaw, pitch and roll of the aircraft relative to the Z axis, Y axis and X axis of the aircraft, respectively.

54. The system of claim 32, wherein the trajectory of the at least one dispensed object is calculated in the same inertial coordinate system used to define the flight conditions of the aircraft.

55. The system of claim 32, wherein the object dispense sequence sets the number of objects to be dispensed from each object dispenser during the simulation.

56. The system of claim 55, wherein the object dispense sequence also sets the timing for dispensing the objects from each object dispenser.

57. The system of claim 32, wherein the trajectory simulation software calculates the trajectory of each dispensed object using a trajectory model formulated for a rigid body with at least five degrees of freedom.

58. The system of claim 32, wherein the dispensed object is a projectile launched from the object dispenser.

59. The system of claim 32, wherein the dispensed object is gravity fed from the object dispenser.

60. The system of claim 32, wherein the fifth processing sequence calculates trajectories for objects dispensed from a plurality of different object dispensers on the selected aircraft.

61. The system of claim 32, wherein the trajectory simulation software further includes another processing sequence for determining a displaying a dispense direction indicator for a plurality of objects dispensed from the at least one object dispenser on the selected aircraft based on calculated trajectories for the plurality of dispensed objects.

62. A computer program product comprising a non-transitory computer usable medium having a computer readable program code embodied therein, the computer readable program code being adapted to be executed to implement a method for simulating trajectories of objects dispensed from a moving aircraft, said method comprising:
- a first processing sequence for generating a graphical user interface to select an aircraft for the simulation;
- a second processing sequence for retrieving object dispenser data from a database to determine a location and an orientation of at least one object dispenser relative to the selected aircraft;
- a third processing sequence for generating a graphical user interface to define flight conditions for the aircraft, the flight conditions including an inertial position in an inertial coordinate system, an inertial heading, and a flight speed of the aircraft;
- a fourth processing sequence for generating a graphical user interface to define an object dispense sequence for the at least one object dispenser; and
- a fifth processing sequence for calculating a trajectory for each object dispensed from the least one object dispenser.

* * * * *